US006363091B1

(12) United States Patent
Zhu et al.

(10) Patent No.: US 6,363,091 B1
(45) Date of Patent: Mar. 26, 2002

(54) COHERENT POPULATION TRAPPING-BASED METHOD FOR GENERATING A FREQUENCY STANDARD HAVING A REDUCED MAGNITUDE OF TOTAL A.C. STARK SHIFT

(75) Inventors: Miao Zhu; Leonard S. Cutler, both of Palo Alto, CA (US)

(73) Assignee: Agilent Technologies, Inc, Palo Alto, CA (US)

( * ) Notice: Subject to any disclaimer, the term of this patent is extended or adjusted under 35 U.S.C. 154(b) by 0 days.

(21) Appl. No.: 09/588,045

(22) Filed: Jun. 5, 2000

(51) Int. Cl.[7] .................................................. H01S 3/13

(52) U.S. Cl. ............................. 372/32; 372/26; 372/31; 372/69; 372/98; 372/108

(58) Field of Search .............................. 372/32, 26, 69, 372/31, 108, 98

(56) References Cited

U.S. PATENT DOCUMENTS 6,201,821 B1 * 1/2001 Zhu et al. ..................... 372/32

* cited by examiner

*Primary Examiner*—Leon Scott, Jr.
(74) *Attorney, Agent, or Firm*—Ian Hardcastle

(57) ABSTRACT

A quantum absorber is provided having transitions that include a first transition between a first lower quantum state and an upper quantum state, and a second transition between a second lower quantum state and the upper quantum state. The first transition and the second transition have energies that correspond to frequencies of $\omega_1$ and $\omega_2$, respectively. The lower quantum states differ in energy by an energy difference subject to a total a.c. Stark shift. Incident electro-magnetic radiation is generated. The incident electro-magnetic radiation includes main frequency components and additional frequency components. The main frequency components are at frequencies of $\Omega_1$ and $\Omega_2$, equal to $\omega_1$ and $\omega_2$, respectively, and differ in frequency by a frequency difference. The additional frequency components collectively have a spectrum. The quantum absorber is irradiated with the incident electro-magnetic radiation. Electro-magnetic radiation from the quantum absorber is detected to generate a detection signal. The frequency difference is controlled to obtain an extremum in the detection signal. The extremum indicates that the frequency difference corresponds to the energy difference between the lower quantum states. The spectrum of the additional frequency components is set to reduce the magnitude of the total a.c. Stark shift, and a frequency standard signal related in frequency to the frequency difference is provided.

29 Claims, 12 Drawing Sheets

COHERENT POPULATION TRAPPING-BASED METHOD FOR GENERATING A FREQUENCY STANDARD HAVING A REDUCED MAGNITUDE OF TOTAL A.C. STARK SHIFT

RELATED DISCLOSURES

This disclosure is related to the following simultaneously-filed disclosures that are incorporated herein by reference:

Coherent Population Trapping-Based Frequency Standard Having a Reduced Magnitude of Total a.c. Stark Shift of inventors Miao Zhu and Leonard S. Cutler Ser. No. 09/587,717;

Detection Method and Detector for Generating a Detection Signal that Quantifies a Resonant Interaction Between a Quantum Absorber and Incident Electro-Magnetic Radiation of inventors Leonard S. Cutler and Miao Zhu Ser. No. 09/588,032; and Coherent Population Trapping-Based Frequency Standard and Method for Generating a Frequency Standard Incorporating a Quantum Absorber that Generates the CPT State with High Efficiency of inventor Miao Zhu Ser. No. 09/587,719.

FIELD OF THE INVENTION

The invention relates to methods for generating high-precision frequency standards and, in particular, for generating frequency standards based on coherent population trapping (CPT).

BACKGROUND OF THE INVENTION

The proliferation of telecommunications based on optical fibers and other high-speed links that employ very high modulation frequencies has led to an increased demand for highly-precise and stable local frequency standards capable of operating outside the standards laboratory. Quartz crystals are the most commonly-used local frequency standard, but in many cases are not sufficiently stable to meet the stability requirements of modern, high-speed communications applications and other similar applications.

To achieve the stability currently required, a frequency standard requires a frequency reference that is substantially independent of external factors such as temperature and magnetic field strength. Also required is a way to couple the frequency reference to an electrical signal that serves as the electrical output of the frequency standard. Potential frequency references include transitions between quantum states in atoms, ions and molecules. However, many such transitions correspond to optical frequencies, which makes the transition difficult to couple to an electrical signal.

Transitions between the levels of certain ions and molecules and between the hyperfine levels of certain atoms have energies that correspond to microwave frequencies in the 1 GHz to 45 GHz range. Electrical signals in this frequency range can be generated, amplified, filtered, detected and otherwise processed using conventional semiconductor circuits.

An early example of a portable frequency standard based on an atomic is frequency reference is the model 5060A frequency standard introduced by the Hewlett-Packard Company in 1964. This frequency standard used a transition between two hyperfine levels of the cesium-133 atom as its frequency reference, and had a frequency accuracy of about two parts in $10^{11}$. Current versions of this frequency standard have an accuracy of about five parts in $10^{13}$ and a stability of a few parts in $10^{14}$.

Less accurate but smaller frequency standards have been built that use a transition between the hyperfine states of a quantum absorber such as a rubidium-87 atom as their frequency reference. This type of frequency standard includes a cell filled with a vapor of rubidium-87 atoms and located in a microwave cavity. The rubidium atoms in the cell are illuminated with light from a rubidium lamp. The light generated by the lamp includes two spectral lines, one of which is filtered out by passing the light through an auxiliary cell filled with rubidium-85 atoms, so that light of essentially only a single frequency illuminates the rubidium atoms.

The rubidium-87 atom has a ground state, the S state, that is split into two groups of states by the hyperfine interaction between the magnetic moments of the electron and nucleus. Each group contains a number of sublevels. The two groups are separated by an energy corresponding to a frequency of about 6.8 GHz. At room temperature, all the sublevels in the groups are approximately equally populated. The first excited state, a P state, is also split by the hyperfine interaction but the splitting is much smaller and can be neglected for the purposes of this discussion. The P state is essentially unpopulated at room temperature. When the rubidium atoms are illuminated with the light from the rubidium lamp/filter cell combination, the light is absorbed since its frequency corresponds to the energy difference between the P state and one of the groups constituting the S state. The light absorption decreases the population of one of the groups constituting the S state and increases the population in the other. As the resulting population imbalance reaches equilibrium, absorption of the incident light decreases.

For convenience, the two groups into which the ground state S of the rubidium-87 atom is split by hyperfine interaction will from now on be called the ground states of the rubidium atom. Feeding microwave energy into the microwave cavity at a frequency of about 6.8 GHz, corresponding to the energy difference between the two ground states, tends to equalize the populations of the states. The change of population causes the absorption of the light transmitted through the cell to increase. This can be detected and the resulting detection signal used to control the microwave frequency to a frequency at which the absorption of the light transmitted through the cell is a maximum. When this condition is met, the microwave frequency corresponds to, and is determined by, the energy difference between the ground states. The microwave signal, or a signal derived from the microwave signal, is used as the frequency standard.

The energy difference between the two ground states is relatively insensitive to external influences such as electric field strength, magnetic field strength, temperature, etc., and corresponds to a frequency that can be handled relatively conveniently by electronic circuits. This makes the energy difference between the ground states a relatively ideal frequency reference for use in a frequency standard. However, in the type of frequency standard just described, interaction between the incident light and the rubidium atoms results in a.c. Stark shift. The a.c. Stark shift changes the energy difference between the ground states, and, hence changes the frequency of the microwave signal. Thus, the a.c. Stark shift reduces the accuracy of the frequency standard. Moreover, since the a.c. Stark shift depends, in part, on the intensity and frequency of the incident light, the a.c. Stark shift converts variations in the intensity and frequency of the incident light into variations in the frequency of the signal generated by the frequency standard. Thus, the a.c. Stark shift additionally reduces the stability of the frequency standard.

The type of frequency standard just described suffers from a number of additional disadvantages. For example, the microwave cavity in which the cell is located and the auxiliary filter cell make the frequency standard complex and expensive to manufacture.

More recently, frequency standards have been proposed that use as their frequency reference coherent population trapping (CPT) in the transition between the hyperfine states of a quantum absorber such as the rubidium-87 atom. The structure of the CPT-based frequency standard can be similar to that of the frequency standard just described, but the CPT-based frequency standard lacks an auxiliary cell and a rubidium lamp, and only needs a microwave cavity if coherent emission, described below, is detected. The cell is illuminated with incident light having two main frequency components in the near infra-red. The incident light can be generated using two phase-locked lasers or by modulating the frequency of a single laser. In the former case, the frequency difference between the main frequency components is determined by the frequency difference between the lasers. In the latter case, the frequency difference between the main frequency components is determined by the modulation frequency applied to the laser.

The frequency difference is controlled to match the frequency corresponding to the energy difference between the two ground states to establish a specific coherence between the ground states, i.e., a condition in which the atoms are in a specific superposition of the ground states. The atoms in this specific superposition of the ground states do not interact with the two main frequency components in the incident light. This leads to the name dark state for the specific superposition of the ground states. The atoms in the dark state also have an oscillating electro-magnetic multipole moment at a frequency equal to the frequency difference. The oscillating electro-magnetic multipole moment emits an electro-magnetic field called coherent emission. When the number of atoms in the dark state reaches a maximum, absorption of the incident light is minimized, transmission of the incident light through the cell is maximized and the fluorescent light generated as a result of the quantum absorber absorbing the incident light is minimized. Also, the coherent emission generated by the quantum absorber's oscillating electro-magnetic multipole moment is maximized.

The coherence condition between the ground states is detected by detecting the portion of the incident light that remains unabsorbed after passing through the quantum absorber, by detecting the fluorescent light generated by the quantum absorber in response to the incident light or by detecting the coherent emission generated by the quantum absorber in response to the incident light. The resulting detection signal is used to control the frequency difference or modulation frequency to a frequency at which the unabsorbed portion of the incident light has a maximum intensity, the fluorescent light generated by the quantum absorber has a minimum intensity or the coherent emission generated by the quantum absorber has a maximum intensity. When the coherence condition is met, the frequency difference or the modulation frequency (or a harmonic thereof) corresponds to, and is determined by, the energy difference between the ground states.

An exemplary CPT-based frequency standard is described by Normand Cyr, Michel Têtu and Marc Breton in All-Optical Microwave Frequency Standard: a Proposal, 42 IEEE Trans. on Instrumentation & Measurement, 640 (April 1993 ). Cyr et al. describe a practical example of a frequency standard that uses a single laser that emits light having a wavelength of 780 nm. The light is frequency modulated at a modulation frequency of 1.139 GHz, one-sixth of the frequency difference of 6.835 GHz corresponding to the energy difference between the ground states of rubidium-87. Cyr et al. disclose setting the modulation index of the frequency modulation to 4.2 to maximize the intensities of the main frequency components having frequencies corresponding to the transitions. The modulation index is the ratio of the deviation in the frequency of the light to the modulation frequency.

In the process of generating CPT, the frequencies of the main frequency components of the incident light are approximately equal to the frequencies corresponding to the two transitions of the quantum absorber. When the first main frequency component is not forbidden by selection rules from connecting one of the ground states to the excited state, it will cause energy shifts, called a.c. Stark shifts, in the other ground state and the excited state. Similarly, the second main frequency component will cause energy shifts, i.e., a.c. Stark shifts, in the one ground state and the excited state, if not forbidden. In a CPT-based frequency standard, the total a.c. Stark shift degrades the accuracy of the frequency standard while variations in the total a.c. Stark shift degrade frequency stability. The total a.c. Stark shift due to the above-described de-tuned frequency components makes the measured energy difference between the ground states significantly different from the unperturbed energy difference between these states.

Thus, what is needed is a method based on CPT for generating a frequency standard that has a substantially reduced total a.c. Stark shift. A reduced total a.c. Stark shift is required to provide the frequency stability required for modern, high-speed communications and similar applications.

SUMMARY OF THE INVENTION

The invention provides a method for generating a frequency standard. In the method, a quantum absorber is provided having transitions including a first transition between a first lower quantum state and an upper quantum state, and a second transition between a second lower quantum state and the upper quantum state. The first transition and the second transition have energies that correspond to frequencies of $\omega_1$ and $\omega_2$, respectively. The lower quantum states differ in energy by an energy difference subject to a total a.c. Stark shift. Incident electro-magnetic radiation is generated. The incident electro-magnetic radiation includes main frequency components and additional frequency components. The main frequency components are at frequencies of $\Omega_1$ and $\Omega_2$, equal to $\omega_1$ and $\omega_2$, respectively, and differ in frequency by a frequency difference. The additional frequency components collectively have a spectrum. The quantum absorber is irradiated with the incident electro-magnetic radiation. Electro-magnetic radiation from the quantum absorber is detected to generate a detection signal. The frequency difference is controlled to obtain an extremum in the detection signal. The extremum indicates that the frequency difference corresponds to the energy difference between the lower quantum states. The spectrum of the additional frequency components is set to reduce the magnitude of the total a.c. Stark shift, and a frequency standard signal related in frequency to the frequency difference is provided.

The spectrum of the additional frequency components may be set in a number of different ways. The spectrum may be set by setting the modulation applied to a source that generates at least one of the main frequency components. Either or both of the frequencies and the intensities of the additional frequency components may be changed to set their spectrum. An additional source may generate all or some of the additional frequency components that are spatially overlapped with the main frequency components. The spectrum of the additional frequency components may be simply be set to one that reduces the total a.c. Stark shift. Alternatively, the spectrum of the additional frequency components may be set in a closed-loop manner to one that reduces the total a.c. Stark shift substantially to zero.

In a frequency standard that employs the frequency standard generating method according to the invention, the additional frequency components substantially reduce the effects of total a.c. Stark shift on the accuracy and stability of the frequency standard signal. Thus, such a frequency standard generates the frequency standard signal with the accuracy and stability required for modern, high-speed communications and similar applications.

DETAILED DESCRIPTION OF THE INVENTION

Figure 1:
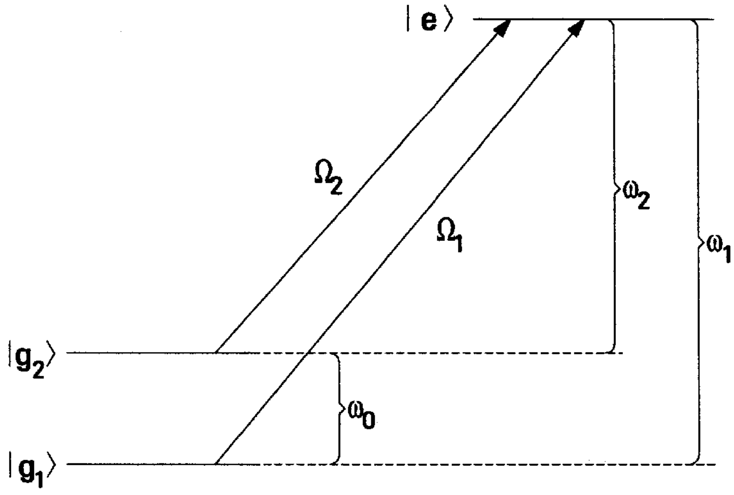
FIG. 1 is an energy diagram showing a simplified quantum absorber having only three states.

FIG. 1 shows a simplified quantum absorber having only three quantum states, namely, an excited state $|e>$, a lower ground state $|g_1>$ and an upper ground state $|g_2>$. Also shown are the transitions between the ground states $|g_1>$ and $|g_2>$ and the first excited state $|e>$. Absorbing a quantum of energy having a frequency $\omega_1$ corresponding to the energy difference between the lower ground state $|g_1>$ and the excited state $|e>$ causes the quantum absorber to move from the lower ground state to the excited state. Absorbing a quantum of energy having a frequency $\omega_2$ corresponding to the energy difference between the upper ground state $|g_2>$ and the excited state causes the quantum absorber to move from the upper ground state to the excited state. Absorbing a quantum of microwave energy having a frequency $\omega_0$ corresponding to the energy difference between the lower ground state $|g_1>$ and the upper ground state $|g_2>$ causes the quantum absorber to move from the lower ground state to the upper ground state. The drawing is not to scale: the energies corresponding to the frequencies $\omega_1$ and $\omega_2$ are many orders of magnitude greater than the energy corresponding to the frequency $\omega_0$. For example, the frequencies $\omega_1$ and $\omega_2$ are typically optical frequencies whereas the frequency $\omega_0$ is a microwave frequency.

Consider the transition between the lower ground state $|g_1>$ and the excited state $|e>$ of the quantum absorber. These states have energies of $E_{g0}$ and $E_{e0}$, respectively. The transition frequency corresponding to the energy of the transition between these two states is:

$$\omega_1=(E_{g0}-E_{e0})/h.$$

Figure 2:
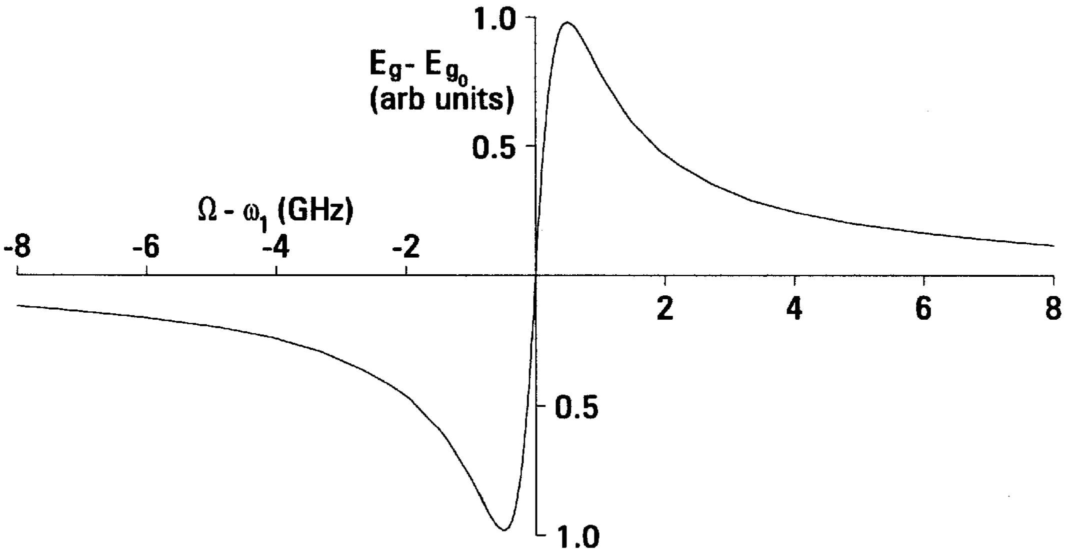
FIG. 2 is a graph showing the shift in the energy of the ground state $|g_1>$ plotted against the frequency de-tuning $\Delta=\Omega-\omega_1$ while the incident electro-magnetic radiation maintains a constant intensity.

The quantum absorber interacting with incident electromagnetic radiation composed of a single frequency component having a frequency of $\Omega$ subjects the energy of the ground state and that of the excited state to a shift, called a.c. Stark shift, or light shift. FIG. 2 is a graph showing the shift in the energy of the ground state $|g_1>$ plotted against the frequency de-tuning $\Delta=\Omega-\omega_1$ while the incident electromagnetic radiation maintains a constant intensity.

The peak-to-peak width of the a.c. Stark shift shown in FIG. 2 is approximately equal to the homogeneous line width of the transition. This part of the a.c. Stark shift, where the frequency de-tuning is less than the line width, will be called the near-resonance a.c. Stark shift. FIG. 2 also shows values of the frequency de-tuning having a magnitude substantially larger than the line width of the transition. When the magnitude of the frequency de-tuning is larger than the line width of the transition, the a.c. Stark shift is approximately inversely proportional to the frequency de-tuning. This part of the total a.c. Stark shift will be called the de-tuned a.c. Stark shift.

When a quantum absorber interacts with incident electro-magnetic radiation composed of multiple frequency components, the shift in the energy of the state $|g_1>$ includes contributions from all the frequency components of the electro-magnetic radiation that connect all the possible transitions from the state $|g_1>$. The same principle applies to the shift in the energy of the state $|g_2>$. One example of generating the dark state is to use incident electro-magnetic radiation composed of two main frequency components having frequencies of $\Omega_1=\omega_1$ and $\Omega_2=\omega_2$. The frequency component $\Omega_2$, which has a negative frequency de-tuning relative to $\omega_1$, causes a negative shift in the energy of the state $|g_1>$. Similarly, the frequency component $\Omega_1$, which has a positive frequency de-tuning relative to $\omega_2$, causes a positive shift in the energy of the state $|g_2>$. Frequency components having positive frequency de-tuning and ones having negative frequency de-tuning are referred to in the art as red de-tuned and blue de-tuned frequency components, respectively. Thus, in this example, the energy difference between the states $|g_2>$ and $|g_1>$ has a positive a.c. Stark shift.

When the intensity of the incident electro-magnetic radiation changes spatially, elements of the quantum absorber at different locations may have different a.c. Stark shifts. This has to be taken into account if the frequency standard uses many quantum absorber elements, as occurs when, for example, the quantum absorber is confined in a cell having finite length along the path of the incident electro-magnetic radiation. The total a.c. Stark shift in a frequency standard characterizes the effect of the contributions of the a.c. Stark shifts in all of the quantum absorber elements resulting from all the frequency components of the incident electro-magnetic radiation connecting all the possible transitions. The magnitude of the total a.c. Stark shift must be reduced, and preferably minimized, if the frequency standard is to have the required accuracy and/or stability.

The invention reduces, and preferably minimizes, the magnitude of the total a.c. Stark shift by modifying the incident electro-magnetic radiation and, in particular, by adding additional frequency components to the incident electro-magnetic radiation. The additional frequency components are additional to the main frequency components having frequencies $\Omega_1$ and $\Omega_2$ that are equal to the transition frequencies $\omega_1$ and $\omega_2$, respectively. The additional frequency components reduce, and preferably minimize, the magnitude of the total a.c. Stark shift collectively generated by all the frequency components of the incident electro-magnetic radiation.

The effect of each additional frequency component of the incident electro-magnetic radiation on reducing the magnitude of the total a.c. Stark shift depends on the frequency and intensity of the additional frequency component. Thus, the collective effect of all the additional frequency components of the incident electro-magnetic radiation on reducing the magnitude of the total a.c. Stark shift depends on the intensities and frequencies of all the additional frequency components. In this disclosure, term spectrum is used to describe the collective frequencies and intensities of the additional frequency components of the incident electro-magnetic radiation. The spectrum of the additional frequency components of the incident electro-magnetic radiation will change if either or both of the frequency and the intensity of just one of the additional frequency components is changed.

The invention will now be further described with reference to some examples in which the quantum absorber is a vapor of rubidium-87 atoms and the incident electro-magnetic radiation is infra-red light with the understanding that the method according to the invention can be practiced using other quantum absorbers and electro-magnetic radiation outside the infra-red frequency range.

Figure 3:
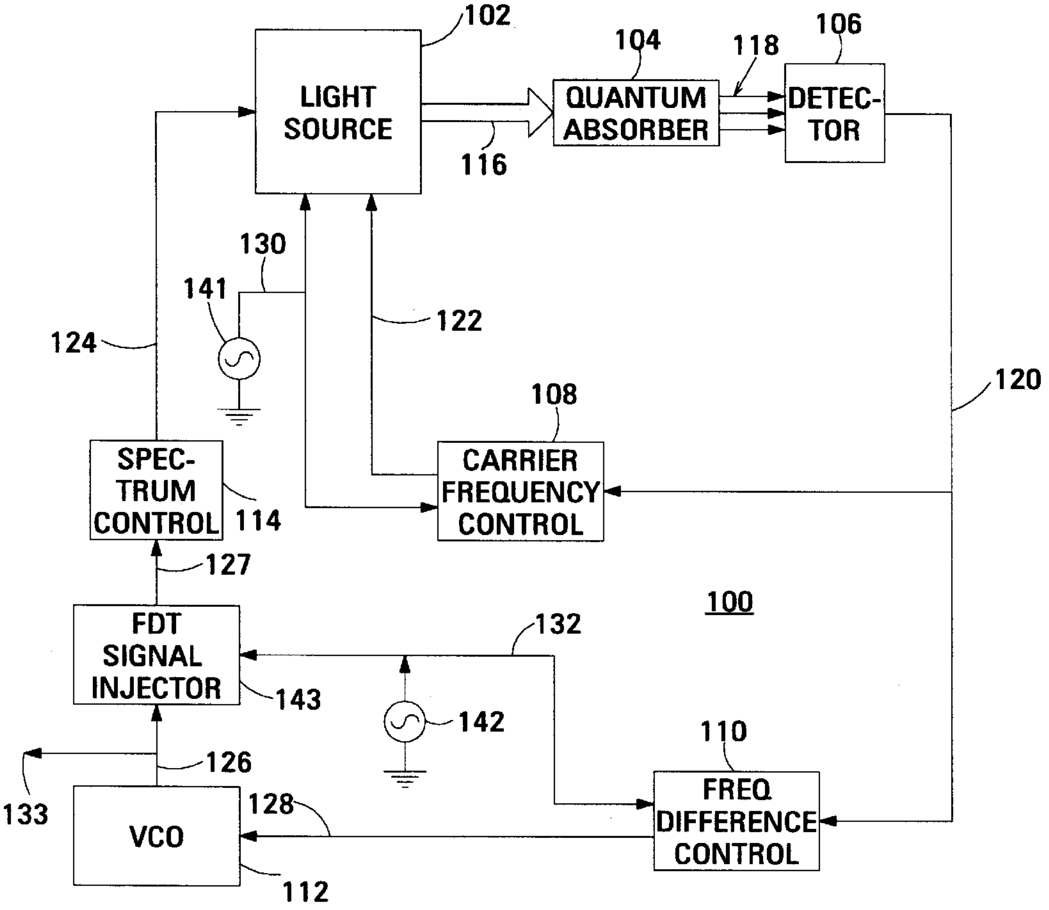
FIG. 3 is a schematic block diagram showing a CPT-based frequency standard that performs a first embodiment of the CPT-based frequency standard generating method according to the invention.

FIG. 3 is a schematic block diagram showing a frequency standard 100 that performs a first embodiment of the CPT-based frequency standard generating method according to the invention. In this embodiment, the magnitude of the total a.c. Stark shift is reduced, but is not controlled to a minimum by a closed-loop control system. The frequency standard is composed of the light source 102, the quantum absorber 104, the detector 106, the carrier frequency controller 108, the frequency difference controller 110, the voltage-controlled oscillator (VCO) 112, the spectrum controller 114. The frequency standard additionally includes the oscillators 141 and 142 and the frequency difference tracking signal injector 143.

The light source 102 generates the incident light 116 that illuminates the quantum absorber 104. The detector 106 is located to detect electro-magnetic radiation from the quantum absorber and generate a detection signal in response to the electro-magnetic radiation. The electro-magnetic radiation detected by the detector may be any one of the unabsorbed portion of the incident light transmitted through the quantum absorber, the fluorescent light generated by the quantum absorber in response to the incident light and the coherent emission generated by the quantum absorber in response to the incident light. The detection signal generated by the detector is fed to the carrier frequency controller 108 and the frequency difference detector 110.

The incident light 116 generated by the light source 102 includes two main frequency components having frequencies of $\Omega_1$ and $\Omega_2$. The frequencies $\Omega_1$ and $\Omega_2$ of the main frequency components are preferably equal to the transition frequencies $\omega_1$ and $\omega_2$, respectively, shown in FIG. 1. A main frequency component having a frequency that differs from a transition frequency by less than about three times the transition line width will be regarded in this disclosure as having a frequency equal to the transition frequency. The incident light also includes additional frequency components whose spectrum is set by the spectrum controller 114 to reduce the magnitude of the total a.c. Stark shift.

In the frequency standard shown, the light source 102 is composed of a single source of light (not shown). The light generated by the source of light is modulated to generate the incident light 116 with the above-mentioned frequency components, as will be described in more detail below with reference to FIGS. 4A and 4B. Alternative ways of generating the incident light to have the required frequency components will also be described below.

The carrier frequency $\Omega_C$ of the incident light 116 generated by the light source 102 is controlled by the carrier frequency controller 108, which will be described below, and is modulated by the modulation drive signal 124 generated by the spectrum controller 114. The frequency of the modulation drive signal 124 is defined by the modulation clock signal 126 generated by the VCO 112. The frequency $\Omega_M$ of the modulation clock signal is preferably set to a frequency equal to $\omega_0/2$, where $\omega_0=(\omega_1-\omega_2)$, by the frequency difference controller 110, as will be described in more detail below. The modulation frequency of $\Omega_M$ sets the frequency difference between the main frequency components to $\omega_0$. Alternatively, the frequency $\Omega_M$ may be set to $\omega_0/n$, where n is an integer.

The VCO 112 generates the modulation clock signal 126, which it feeds to the input of the frequency difference tracking signal injector 143 interposed between the VCO and the spectrum controller 114. The frequency difference tracking signal injector will be described below. The VCO additionally feeds the modulation clock signal to the output 133. The modulation clock signal at the output 133 can be used as a frequency standard signal. Alternatively, conventional phase-locked loop and frequency divider circuits, or other techniques, can be used to generate a frequency standard signal having a more convenient frequency from the modulation clock signal 126. Such frequency standard signal has a frequency accuracy and stability defined by the modulation clock signal 126.

As will be described in further detail below, the frequency difference tracking signal injector 143 generates the modulation clock signal 127 from the modulation clock signal 126. The spectrum controller 114 generates the modulation drive signal 124 with a frequency defined by that of the modulation clock signal 127 and feeds the modulation drive signal to the light source 102. The amplitude of the modulation drive signal is defined by the spectrum controller and determines the modulation index of the incident light 116 generated by the light source. The spectrum controller sets the amplitude of the modulation drive signal to a level that modulates the incident light with a modulation index that generates the additional frequency components with a spectrum that reduces, and preferably minimizes, the magnitude of the total a.c. Stark shift. The modulation index β of the incident light is the ratio of the frequency deviation ΔΩ of the incident light to the modulation frequency $\Omega_M$, i.e., $\beta=\Delta\Omega/\Omega_M$.

Setting the modulation index of the incident light 116 sets the spectrum of the additional frequency components by defining the intensities of the additional frequency components. In this first embodiment, the frequencies of the additional frequency components remain fixed by the need to generate the main frequency components with frequencies equal to the transition frequencies $\omega_1$ and $\omega_2$. In other embodiments that will be described below, the spectrum of the additional frequency components is set by setting one or both of the intensities and the frequencies of at least some of the additional frequency components. In all embodiments, the spectrum controller sets the spectrum of the additional frequency components to reduce, and preferably minimize, the magnitude of the total a.c. Stark shift.

As noted above, the carrier frequency $\Omega_C$ of the incident light 116 generated by the light source 102, i.e., the unmodulated frequency of the incident light, is controlled by the control signal 122 generated by the carrier frequency controller 108. To aid the operation of the carrier frequency controller, the carrier frequency is additionally modulated by the carrier frequency tracking signal 130 generated by the oscillator 141. The frequency of the carrier frequency tracking signal should be greater than the linewidth of the resonance at the frequency $\omega_0$, shown in FIGS. 6A, 6B and 6C. A typical value is 10 kHz. The oscillator 141 feeds the carrier frequency tracking signal to the light source 102 and also to the carrier frequency controller 108.

The carrier frequency controller 108 operates in response to the detection signal 120 and the carrier frequency tracking signal 130 to set the carrier frequency of the incident light 116 generated by the light source 102 to a frequency equal to $(\omega_1+\omega_2)/2$. The carrier frequency controller includes a synchronous detector (not shown) that operates in response to the carrier frequency tracking signal to detect variations in the detection signal 120 at the frequency of the carrier frequency tracking signal. The carrier frequency controller generates the control signal 122 from the detected variations. The control signal 122 controls one or more appropriate parameters of the light source 102 to set the carrier frequency $\Omega_C$.

Figure 6A:
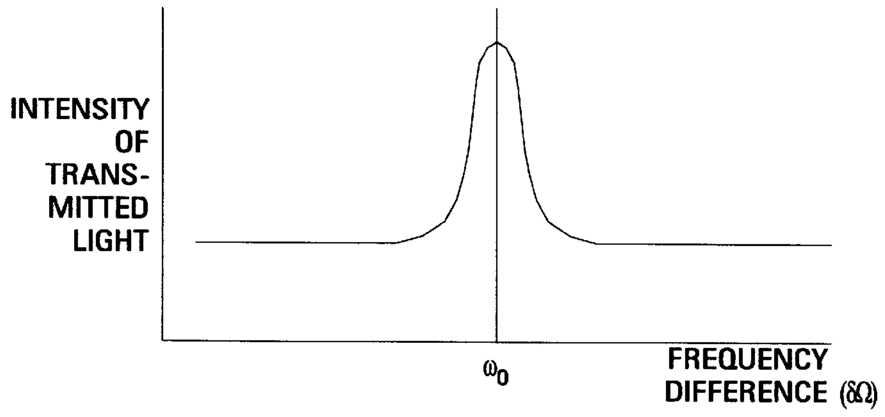
FIGS. 6A, 6B and 6C are graphs showing examples of the variation of the intensities of the transmitted light, fluorescent light and coherent emission, respectively, with the frequency difference $\delta\Omega$ between the main frequency components of the incident light.
Figure 6B:
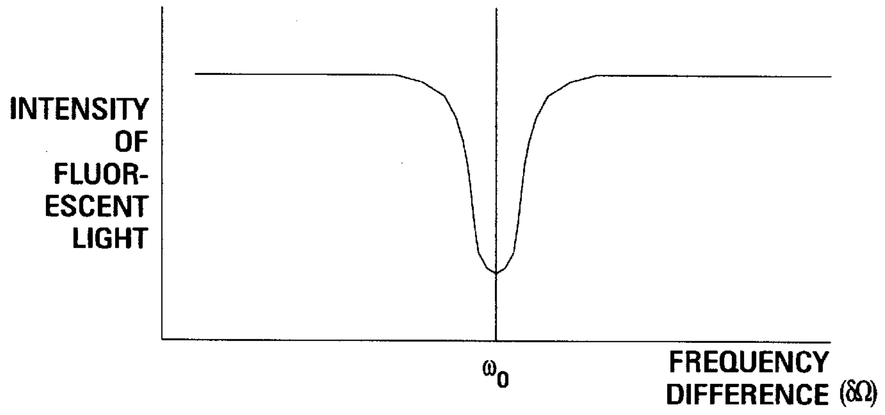
Figure 6C:
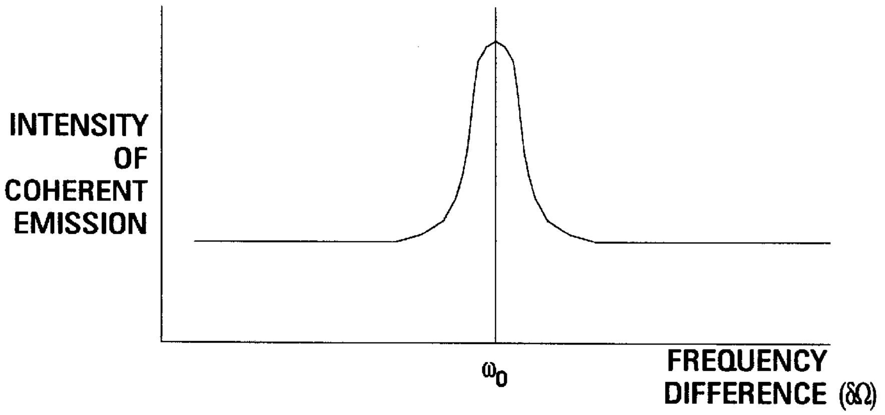

The frequency $\Omega_M$ of the modulation clock signal 126 generated by the VCO 112, and, hence, the modulation frequency of the incident light 116, are set by the control signal 128 generated by the frequency difference controller 110. The frequency $\Omega_M$ is preferably set to $\omega_0/2$, where $\omega_0=(\omega_1-\omega_2)$. To aid the operation of the frequency difference controller, the oscillator 142 generates the frequency difference tracking signal 132. The frequency of the frequency difference tracking signal should be less than or equal to the line width of the resonance at the frequency $\omega_0$, as shown in FIGS. 6A, 6B and 6C. A typical value is 100 Hz. The output of the oscillator 142 is connected to an input of the frequency difference controller and to an input of the frequency difference tracking signal injector 143.

The frequency difference tracking signal injector 143 receives the modulation clock signal 126 from the VCO 112 and the frequency difference tracking signal 132 from the oscillator 142. The frequency difference tracking signal injector modulates the frequency of the modulation clock signal 126 at the frequency of the frequency difference tracking signal and feeds the resulting modulation clock signal 127 to the spectrum controller 114. The frequency difference tracking signal injector also isolates the frequency standard signal fed to the output 133 from the frequency difference tracking signal to prevent the latter signal from impairing the accuracy and stability of the former signal.

The frequency difference controller 110 includes a synchronous detector (not shown) that operates in response to the frequency difference tracking signal 132 to detect variations in the detection signal 120 at the frequency of the frequency difference tracking signal. The frequency difference controller uses the detected variations to generate the control signal 128 that sets the frequency $\Omega_M$ of the modulation clock signal 126 generated by the VCO 112 to a value preferably equal to $\omega_0/2$.

Figure 4A:
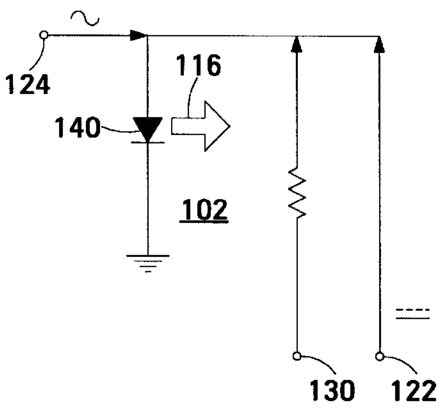
FIG. 4A is a schematic block diagram showing the configuration of a first example of the light source of the frequency standard shown in FIG. 3.

FIG. 4A is a schematic block diagram showing a first example of the light source 102 in more detail. In this example, the light source includes the laser 140 that generates the incident light 116. The laser receives the control signal 122 from the carrier frequency controller 108 as its DC drive signal, and additionally receives the modulation drive signal 124 from the spectrum controller 114 and the carrier frequency tracking signal 130 from the oscillator 141.

The frequency of the light generated by a semiconductor laser depends on the drive current through the laser. Consequently, in this embodiment, the DC drive signal 122 determines the frequency $\Omega_C$ of the incident light 116 generated by the laser. The frequency of the incident light is modulated by superimposing the modulation drive signal 124 on the DC drive signal. The frequency of the incident light is additionally modulated by superimposing the carrier frequency tracking signal 130 on the DC drive signal.

Figure 4B:
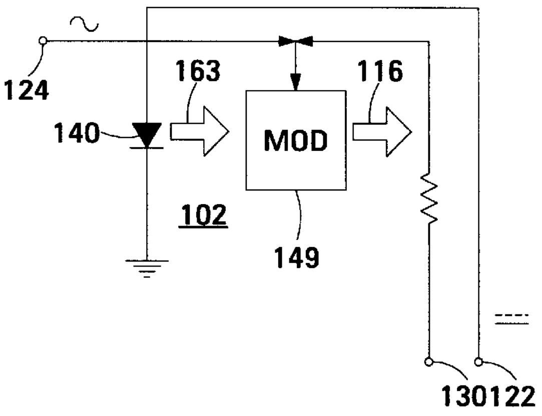
FIG. 4B is a schematic block diagram showing the configuration of a second example of the light source of the frequency standard shown in FIG. 3.

FIG. 4B is a schematic block diagram showing a second example of the light source 102 in which a modulator external to the laser is used to modulate the incident light. In this example, the light source includes the laser 140 and the modulator 149. The laser receives the control signal 122 from the carrier frequency controller 108 as its DC drive signal. The modulator receives the modulation drive signal 124 from the spectrum controller 114, and additionally receives the carrier frequency tracking signal 130 from the oscillator 141. The laser generates the light 163, which is fed to the modulator 149. The modulator modulates at least one of the frequency, amplitude and phase of the light 163 in response to the modulation drive signal and the carrier frequency tracking signal to generate the incident light 116. The carrier frequency tracking signal 130 may alternatively be fed to the laser 140.

The light source 102 may include additional optical elements (not shown) such as lenses, polarizers, wave plates, prisms and optical fibers that further define the characteristics of the incident light 116. For example, a polarizer and a wave plate (not shown) that circularly polarize the incident light may be located between the laser 140 and the quantum absorber 104.

Figure 5A:
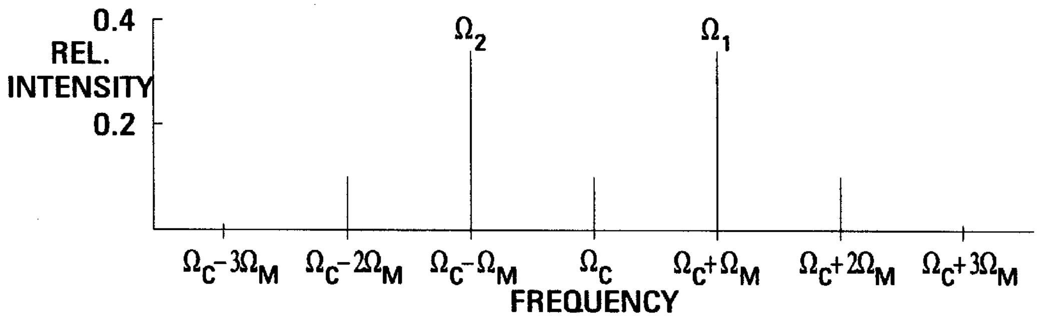
FIG. 5A is a graph showing the spectral energy distribution of incident light having a modulation index of about 1.84.

In a CPT-based frequency standard in which the main frequency components are generated by modulating the incident light having a carrier frequency of $(\omega_1+\omega_2)/2$ at a modulation frequency of $(\omega_1-\omega_2)/2$, one choice of the modulation index of the incident light is about 1.84. FIG. 5A shows the resulting spectral energy distribution. A modulation index of 1.84 maximizes the intensities of the main frequency components with frequencies of $\Omega_1$ and $\Omega_2$, as shown in FIG. 5C. This maximizes the signal-to-noise ratio of the detection signal. At a modulation index of 1.84, the intensities of the additional frequency components with frequencies of $\Omega_C$ and $\Omega_C\pm2\Omega_M$ are comparable to one another, and significantly smaller than those of the main frequency components. The frequencies of the additional frequency components are fixed since they depend on $\Omega_C$ and $\Omega_M$, However, it can be seen from FIG. 5D that this choice of modulation index results in a significant total a.c. Stark shift.

In the CPT-based frequency standard 100 according to the invention, the spectrum controller 114 generates the modulation drive signal 124 with an amplitude that sets the modulation index of the incident light 116 to a value that generates the additional frequency components with a spectrum that reduces, and preferably minimizes, the magnitude of the total a.c. Stark shift. This value of the modulation index is different from that which maximizes the signal-to-noise ratio of the detection signal. The value of the modulation index that minimizes the total a.c. Stark shift depends in part on the operating temperature of the quantum absorber 104. In a preferred embodiment in which the quantum absorber was a saturated vapor of rubidium-87 atoms at an operating temperature of 60° C., a modulation index of about 2.4 was appropriate to minimize the a.c. Stark shift. In this example, modulating light having a carrier frequency of $\Omega_C$ at a modulation frequency of $\Omega_M$, both as defined above, with a modulation index close to 2.4 generates the incident light 116 that includes the main frequency components having frequencies of $\Omega_1$ and $\Omega_2$, and that also includes additional frequency components having frequencies different from $\Omega_1$ and $\Omega_2$. The additional frequency components have a spectrum that substantially reduces, and preferably minimizes, the magnitude of the total a.c. Stark shift.

Figure 5B:
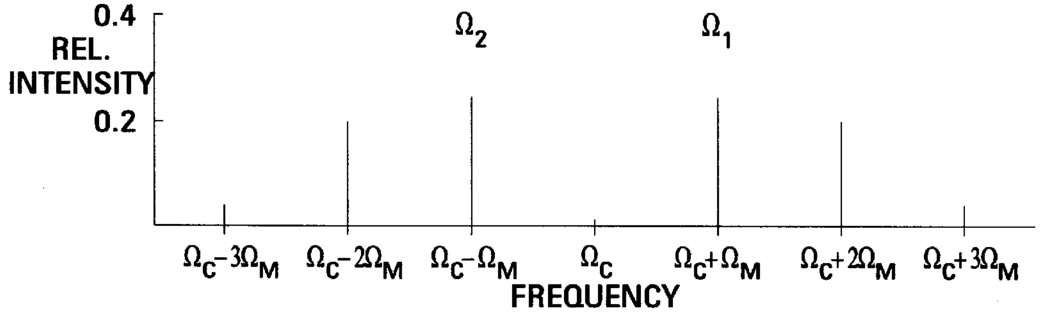
FIG. 5B is a graph showing the spectral energy distribution of incident light having a modulation index of about 2.4.
Figure 5C:
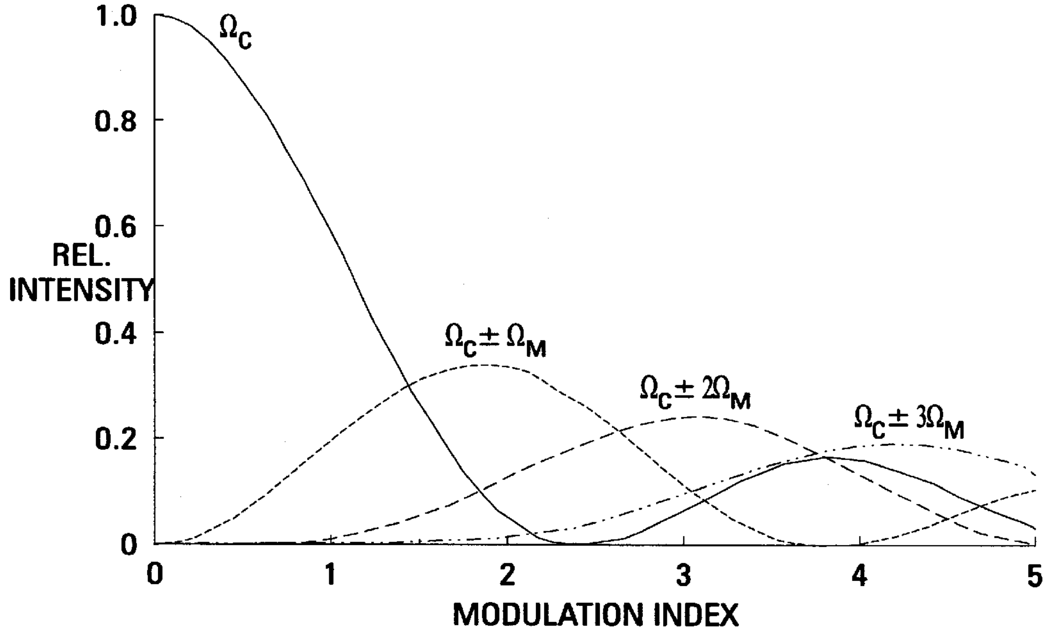
FIG. 5C is a graph showing how the intensities of the frequency components having frequencies of $\Omega_C$, $\Omega_C\pm\Omega_M$, $\Omega_C\pm2\Omega_M$ and $\Omega_C\pm3\Omega_M$ vary with the modulation index.
Figure 5D:
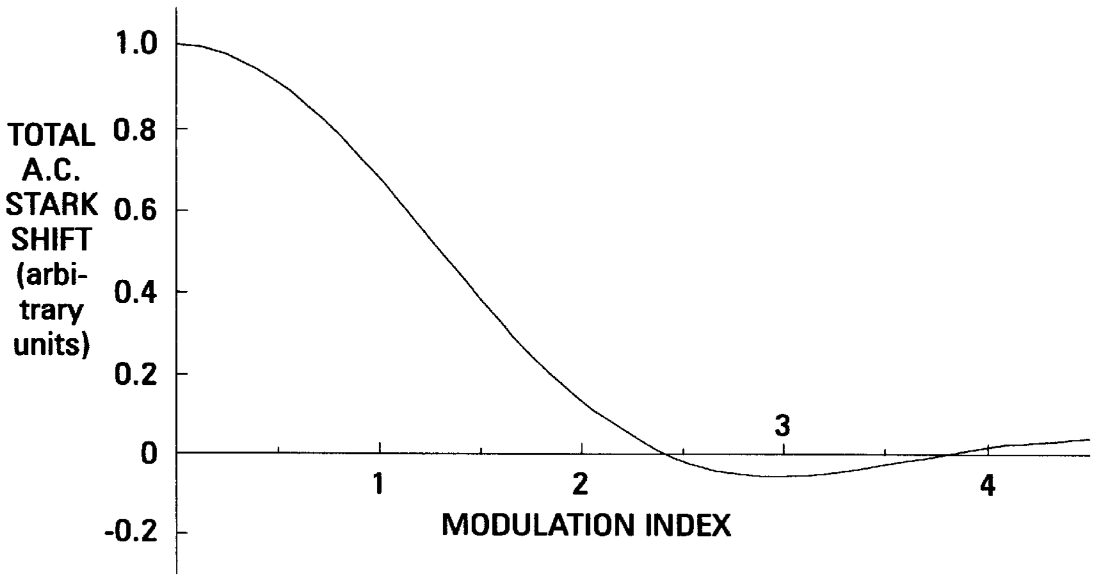
FIG. 5D is a graph showing an example of the variation of the total a.c. Stark shift with the modulation index of the incident light.

FIG. 5B shows the characteristics of the incident light 116 obtained when light having a carrier frequency of $\Omega_C=(\omega_1+\omega_2)/2$ is modulated at a modulation frequency of $\Omega_M=(\omega_1-\omega_2)/2$ with a modulation index of 2.4 in accordance with the invention. Increasing the modulation index above 1.84 decreases the intensities of the main frequency components with frequencies of $\Omega_1$ and $\Omega_2$, and changes the spectrum of the additional frequency components by increasing the intensities of the additional frequency components with frequencies of $\Omega_C\pm2\Omega_M$ and $\Omega_C\pm3\Omega_M$, as shown in FIG. 5C. This change in the spectrum of the additional frequency components reduces the magnitude of the total a.c. Stark shift, as shown in FIG. 5D. In the preferred embodiment described above, a modulation index of 2.4 results in the additional frequency components having a spectrum that reduces the magnitude of the total a.c. Stark shift to zero or close to zero, as shown in FIG. 5D.

FIG. 5D additionally shows that the modulation index may deviate from its optimum value without a sharp increase in the total a.c. Stark shift. This allows an acceptably low total a.c. Stark shift to be obtained using the arrangement shown in FIG. 3 in which the modulation index is fixed, and is not controlled to its optimum value by a closed-loop feedback system.

A possible side effect of superimposing an a.c. modulation drive signal on the DC drive signal of a semiconductor laser to modulate the frequency of the incident light generated by the laser is a modulation of the intensity of the incident light. If amplitude modulation coherent with the frequency modulation occurs, this can cause the laser to generate frequency components having intensities that are asymmetrical about the carrier frequency. When this occurs, a different modulation index from that disclosed above may be required to provide the desired reduction in the magnitude of the total a.c. Stark shift.

The type of modulation and the values of the carrier frequency and modulation frequency just described are not critical to the invention, and other types of modulation and other carrier and modulation frequencies can be used. For example, the modulation frequency $\Omega_M$ can be a frequency equal to the frequency difference $\omega_0$ divided by an integer other than two. As another example, the carrier frequency can be a frequency equal to the transition frequency $\omega_1$ or the transition frequency $\omega_2$, and the modulation frequency can be a frequency equal to the frequency difference $\omega_0$ divided by an integer. In any case, the modulation of the carrier frequency is set so that the frequency components additional to the main frequency components having frequencies of $\Omega_1$ and $\Omega_2$ have a spectrum that reduces, and preferably minimizes, the magnitude of the total a.c. Stark shift. Moreover, the modulation of the incident light can be frequency modulation, amplitude modulation, phase modulation or any combination of two or more of these modulations.

In the preferred embodiment of the frequency standard 100, atoms of rubidium-87 in the vapor state are used as the quantum absorber 104. Atoms of cesium-133 or another alkali metal may alternatively be used. Alternatively, suitable other atoms, ions or molecules may be used as the quantum absorber. In a practical embodiment, the laser 104 was operated to generate light with a frequency component having a wavelength of 795 nm, which corresponds to the $D_1$ line of rubidium-87. The $D_1$ line is preferred as it increases the signal-to-noise ratio of the detection signal 120. The $D_2$ line would require a wavelength of 780 nm. Cesium would require wavelengths of 895 nm and 852 nm for the $D_1$ line and the $D_2$ line, respectively.

In a preferred embodiment of the frequency standard 100 that uses a vapor of rubidium-87 atoms as the quantum absorber 104, the rubidium atoms are confined in a cell (not shown) structured to allow the incident light 116 to illuminate the rubidium atoms and to allow any one of the portion of incident light that remains unabsorbed by the rubidium atoms, the fluorescent light generated by the rubidium atoms in response to the incident light and the coherent emission generated by the rubidium atoms in response to the incident light to reach the detector 106. For example, the cell may be cylindrical in shape and made of a transparent material such as, but not limited to, glass, fused quartz or sapphire.

When a cylindrical cell is used, it is located relative to the light source 102 and the detector 106 so that the incident light 116 passes through one end wall of the cell, and the portion of the incident light that is transmitted by the quantum absorber 104, called the transmitted light, leaves the cell through the opposite end wall and impinges on the detector 106. Fluorescent light generated by the quantum absorber in response to the incident light leaves the cell mainly through its curved side walls. When the fluorescent light is detected, the detector 106 should cover the largest possible solid angle around the cell to increase its detection efficiency. Additional optical elements (not shown) such as mirrors can be used to cover the large solid angle around the cell and to guide the fluorescent light to the detector. Alternatively multiple sub-detectors located around the cell to cover a large solid angle can be used as the detector. When the coherent emission generated by the quantum absorber 104 is detected, the cell may be placed in a microwave resonance cavity (not shown) coupled to the detector 106.

The transmitted light, the fluorescent light and the coherent emission, one of which constitute the electro-magnetic radiation from the quantum absorber 104, have intensities that depend on the frequency difference $\delta\Omega$ between the main frequency components of the incident light 116, as shown in FIGS. 6A, 6B and 6C. These curves assume that the relationship $\{(\Omega_1+\Omega_2)-(\omega_1+\omega_2)\}$ remains fixed. The detection signal 120 generated by the detector 106 in response to the electro-magnetic radiation from the quantum absorber has an extremum when the frequency difference $\delta\Omega$ between the frequencies of the main frequency components is equal to the difference $\omega_0$ between the transition frequencies $\omega_1$ and $\omega_2$.

A background slope in the spectral density of the electro-magnetic radiation detected by the detector 106 can introduce an error in the frequency at which the extremum in the detection signal occurs. Such error can be reduced by using suitable detection methods including detecting the extremum in the detection signal 120 at the frequency of the third harmonic of the frequency difference tracking signal 132. References in this disclosure to the detection signal having an extremum are to be taken to refer to the extremum in the detection signal detected in a way, such as that just described, that reduces any errors caused by a background slope in the spectral density of the detected electro-magnetic radiation.

The working temperature of the cell is stabilized at a suitable temperature. The cell is filled with a vapor of rubidium-87 atoms that act as the quantum absorber and preferably additionally contains solid or liquid rubidium so that the vapor is saturated. In a practical embodiment, the rubidium vapor was maintained at a temperature of about 60° C., with a stability of a few millidegrees C. A lower temperature can be used when cesium atoms are used as the quantum absorber.

The inside surface of the cell can be coated with a hydrocarbon wax. Additionally or alternatively, the cell can contain a buffer gas. These measures reduce interactions of the atoms constituting the quantum absorber with the walls of the cell and with others of the atoms of the quantum absorber and additionally provide a minimally-perturbing confinement of the quantum absorber. Reducing these interactions and providing confinement reduces the width of the resonance at the frequency $\omega_0$ shown in FIGS. 6A, 6B and 6C, and, hence, increases the precision with which the resonance can be detected. One or more noble gasses, nitrogen, a gaseous hydrocarbon such as methane, ethane or propane, or a mixture of such gasses may be used as the buffer gas.

The cell is enclosed in an enclosure of a magnetic shielding material to isolate the quantum absorber from external magnetic fields. A nearly homogeneous magnetic field is applied to the quantum absorber to separate the 0—0 resonance from other resonances and to provide a quantizing axis. In a practical embodiment, the magnetic field strength was typically in the range from 1 to 100 $\mu$T.

Figure 7:
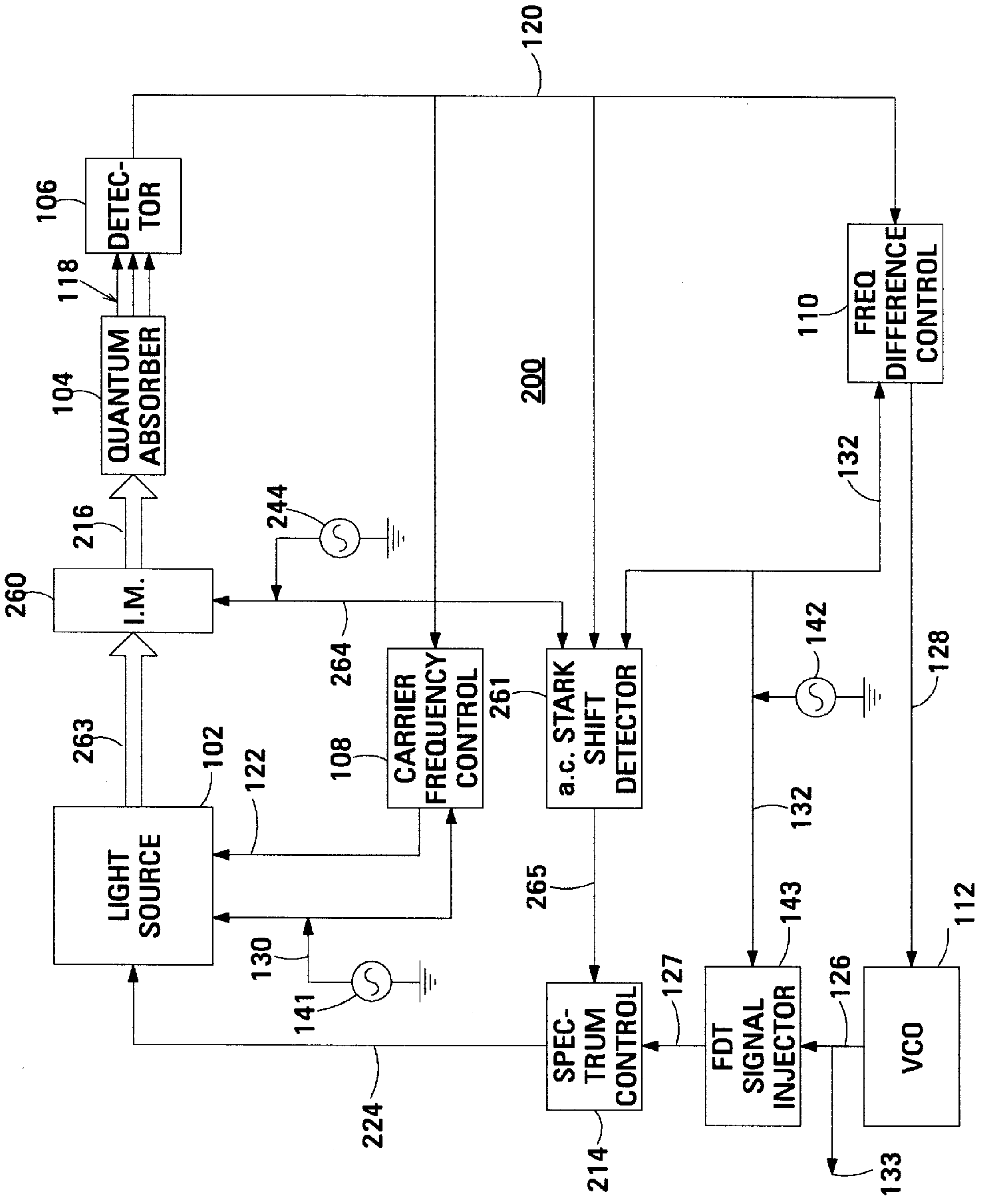
FIG. 7 is a schematic block diagram showing a CPT-based frequency standard that performs a second embodiment of the CPT-based frequency standard generating method according to the invention in which the spectrum of the additional frequency components is controlled to minimize the magnitude of the total a.c. Stark shift.

In the frequency standard 100 that performs a first embodiment of the CPT-based frequency standard generating method according to the invention, the spectrum of the additional frequency components is set to a fixed value that reduces, and preferably to minimizes, the magnitude of the total a.c. Stark shift. FIG. 7 shows frequency standard 200 that performs a second embodiment of the CPT-based frequency standard generating method according to the invention. In this embodiment, the spectrum of the additional frequency components of the incident light 216 that illuminates the quantum absorber 104 is dynamically controlled by a closed-loop control circuit to set the spectrum to minimize the magnitude of the total a.c. Stark shift. Elements of the frequency standard 200 that correspond to elements of the frequency standard 100 described above with reference to FIG. 3 are indicated using the same reference numerals, and will not be described in detail here.

The frequency standard 200 additionally includes the intensity modulator 260, the a.c. Stark shift detector 261 and the oscillator 244. The oscillator 244 generates the intensity modulation signal 264, which it feeds to the intensity modulator and the a.c. Stark shift detector 261. The intensity modulator is interposed between the light source 102 and the quantum absorber 104. An acousto-optical intensity modulator may be used as the intensity modulator. The intensity modulator receives the light 263 from the light source and receives the intensity modulation signal from the oscillator 244. The intensity modulator modulates the intensity of the light 263 to generate the intensity-modulated incident light 216 that illuminates the quantum absorber 104.

Alternatively, the intensity modulator 260 may be built into the light source 102. For example, the intensity modulator may modulate the intensity of the incident light 216 by modulating the current through the laser 140 (FIG. 4A) that forms part of the light source. As another example, the intensity modulator may modulate the current through the laser and the temperature of the laser. Modulating the temperature of the laser is feasible since the frequency of the intensity modulation signal is low, typically about 10 Hz, and the thermal mass of the laser is small. The intensity modulation frequency should lie between the upper cut-off frequency of the frequency difference control loop that includes the frequency difference controller 110 and the frequency at which the frequency difference is modulated, typically 100 Hz, as described above.

The a.c. Stark shift detector 261 has inputs that receive the detection signal 120 from the detector 106, the intensity modulation signal 264 from the oscillator 244 and the frequency difference tracking signal 132 from the oscillator 142. The output of the a.c. Stark shift detector is connected to the control input of the spectrum controller 214.

If the spectrum of the additional frequency components in the incident light 216 does not reduce the magnitude of the total a.c. Stark shift to zero, the incident light 216 will subject the ground states of the quantum absorber 104 to a total a.c. Stark shift that changes synchronously with the intensity modulation of the incident light. The changing total a.c. Stark shift modulates the frequency difference signal, and introduces side bands around the frequency of the frequency difference tracking signal in the detection signal 120.

The a.c. Stark shift detector 261 detects the low-frequency modulation component in the detection signal 120 and generates the spectrum control signal 265. The a.c. Stark shift detector 261 feeds the spectrum control signal to the spectrum controller 214. The spectrum controller operates in response to the spectrum control signal to modify the spectrum of the incident light to one that minimizes the magnitude of the total a.c. Stark shift. In the embodiment shown, the spectrum controller modifies the spectrum of the incident light by controlling the amplitude of the modulation drive signal 224, and, hence, the modulation index of the incident light 216.

The a.c. Stark shift detector 261 includes a first synchronous detector (not shown) that operates in response to the frequency difference tracking signal 132 to detect variations in the detection signal 120 at the frequency of the frequency difference tracking signal. The first synchronous detector generates an output signal that represents the difference between the frequency difference $\delta\Omega$ and the frequency corresponding to the energy difference between the ground states $|g_2>$ and $|g_1>$. This output signal contains a component at the frequency of the intensity modulation signal when the total a.c. Stark shift is not reduced to zero.

The a.c. Stark shift detector 261 additionally includes a second synchronous detector (not shown) that operates in response to the intensity modulation signal 264 to detect variations in the component of the output signal of the first synchronous detector at the frequency of the intensity modulation signal. The variations in the output of the first synchronous detector are caused by the a.c. Stark shift in response to the intensity modulation of the incident light 216. The second synchronous detector generates the spectrum control signal 265 in response to the variations in the component at the frequency of the intensity modulation signal.

The frequency difference controller 110 includes a synchronous detector equivalent to the first synchronous detector of the a.c. Stark shift detector 261. Thus, the first synchronous detector can optionally be omitted from the a.c. Stark shift detector, and the output of the synchronous detector in the frequency difference controller can be fed to the input of the second synchronous detector of the a.c. Stark shift detector. Operation of the second synchronous detector would be unchanged from that described above. Ways other than those just described may be used to derive the total a.c. Stark shift from the detection signal 120.

The spectrum controller 214 generates the modulation drive signal 224 at the frequency defined by the modulation clock signal 126 generated by the VCO 112 and feeds the modulation drive signal to the light source 102. The spectrum controller 114 described above with reference to FIG. 3 generates the modulation drive signal 124 with a substantially fixed amplitude and the modulation drive signal modulates the incident light 216 generated by light source with a substantially fixed modulation index. In contrast, the spectrum controller 214 generates the modulation drive signal 224 with an amplitude determined by the spectrum control signal 265. For example, the spectrum controller may include a variable gain element (not shown) whose gain is controlled by the spectrum control signal 265. The spectrum control signal controls the gain of the variable gain element in such a sense that when the spectrum control signal indicates an increase in the magnitude of the total a.c. Stark shift, the spectrum controller 214 sets the amplitude of the modulation drive signal to reduce the magnitude of the total a.c. Stark shift. This tends to minimize the magnitude of the total a.c. Stark shift, and provides a substantial increase in the accuracy and stability of the modulation clock signal at the output 133.

Closed-loop arrangements different from that just described may be used to control the spectrum of the additional frequency components to minimize the magnitude of the total a.c. Stark shift. Some closed-loop arrangements do not involve modulating the intensity of the incident light 116.

Figure 8:
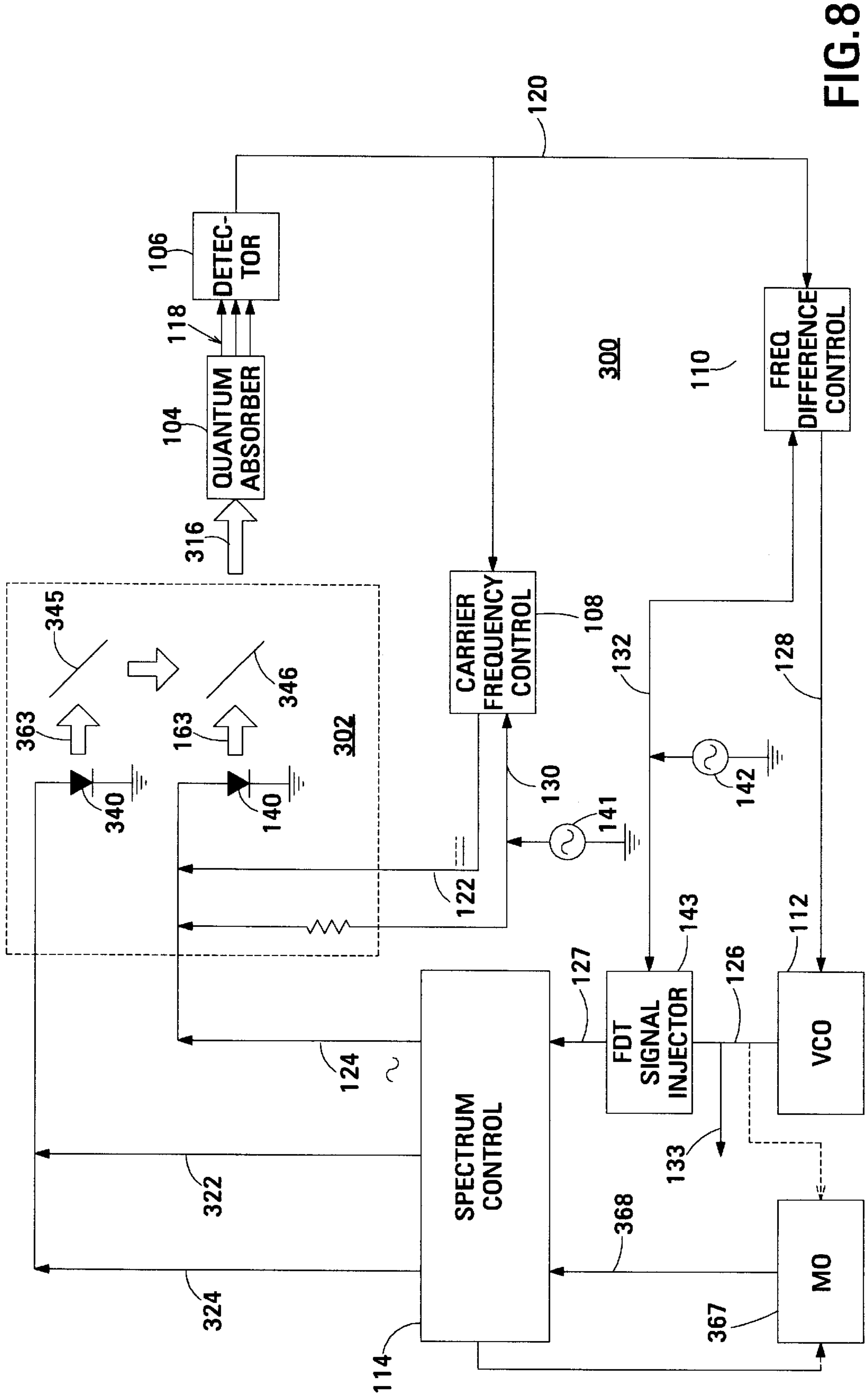
FIG. 8 is a schematic block diagram showing a CPT-based frequency standard that performs a third embodiment of the CPT-based frequency standard generating method according to the invention.
Figure 10:
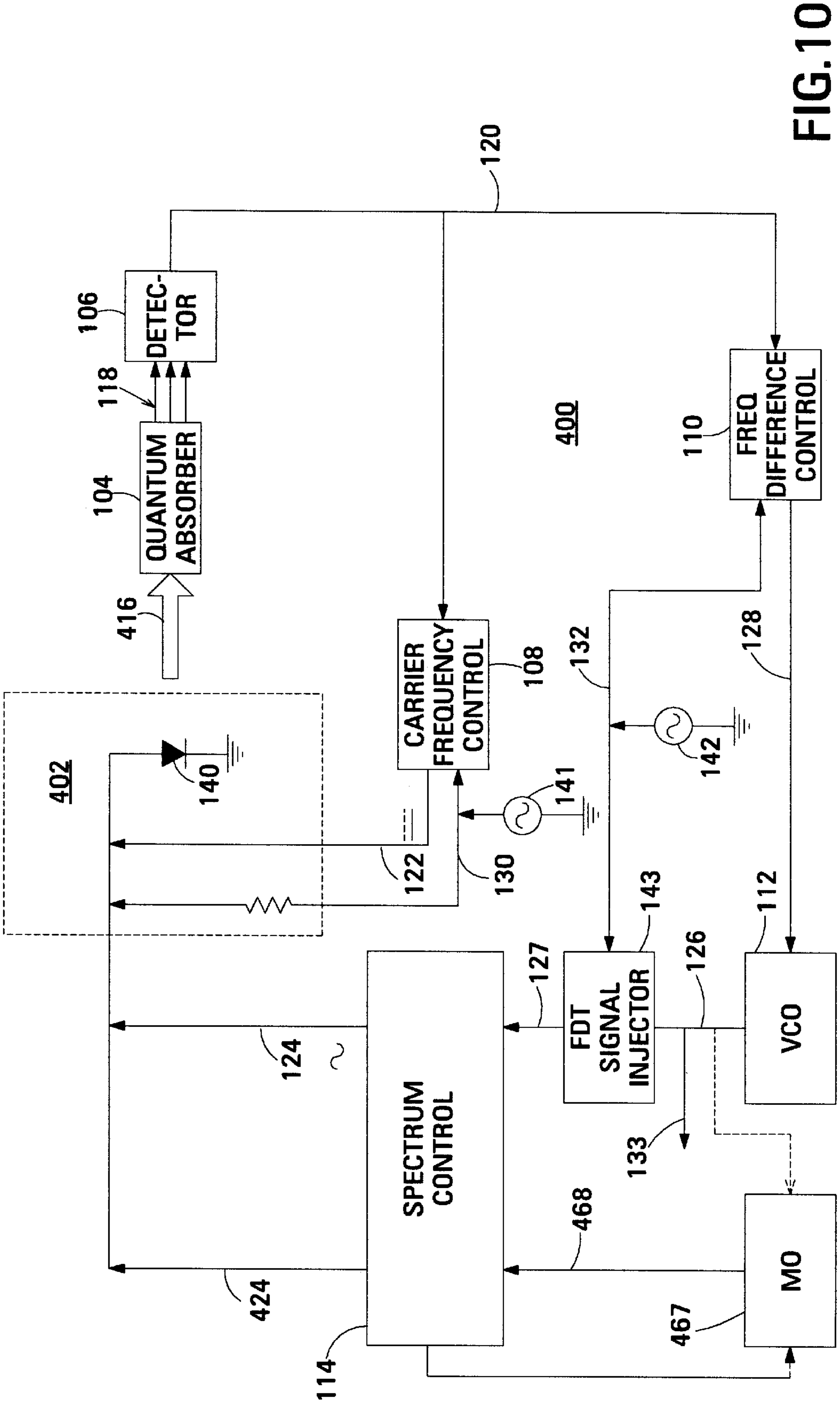
FIG. 10 is a schematic block diagram showing a CPT-based frequency standard that performs a fourth embodiment of the CPT-based frequency standard generating method according to the invention.
Figure 12:
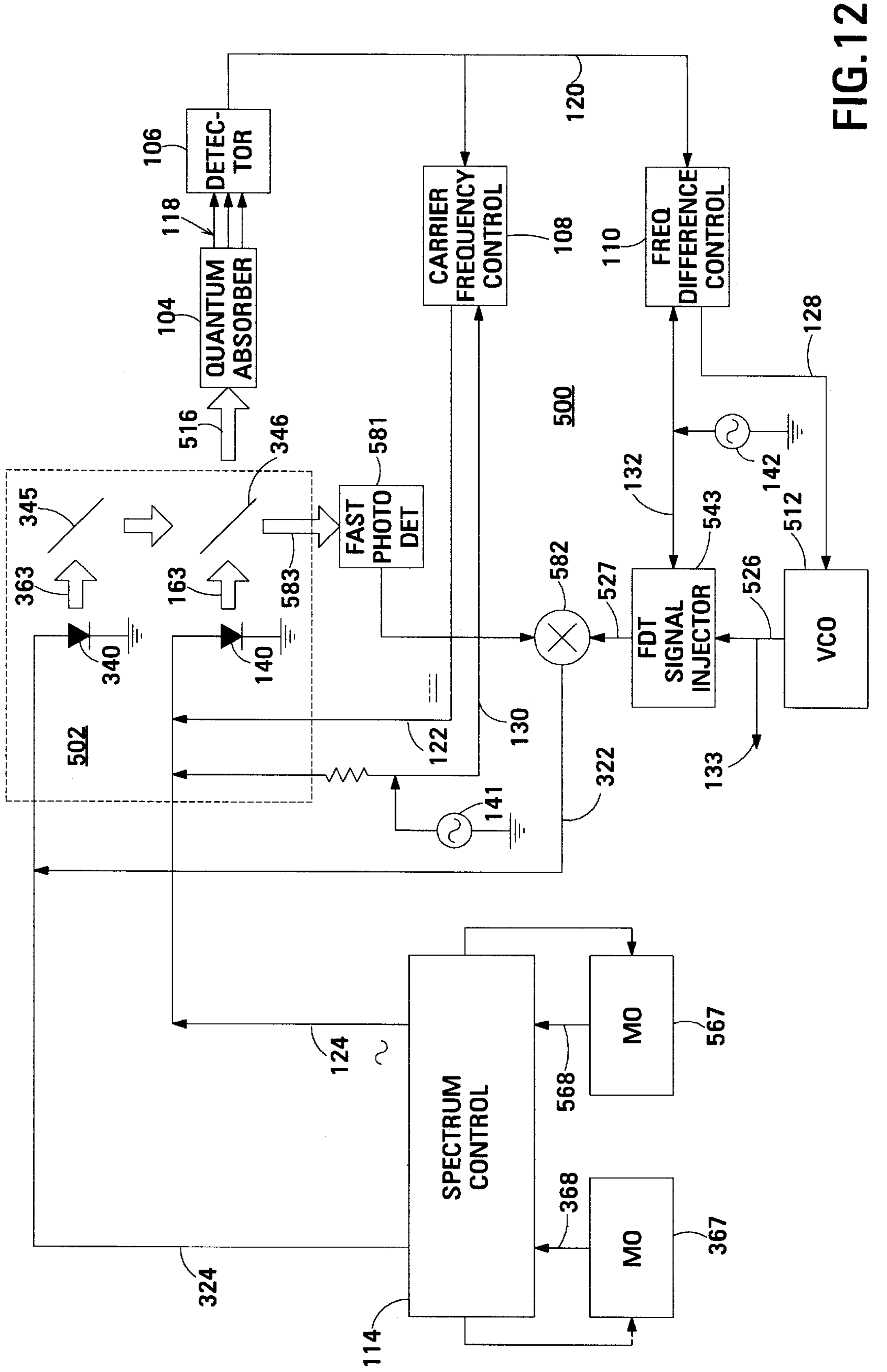
FIG. 12 is a schematic block diagram showing a CPT-based frequency standard according that performs a fifth embodiment of the CPT-based frequency standard generating method to the invention in which the main frequency components of the incident light are independently generated.

In the first and second embodiments of the frequency standard generating method according to the invention, the additional frequency components are harmonically related to the frequency of the modulation drive signal that generates the main frequency components. Consequently, in these embodiments, the frequency of one or more of the additional frequency components cannot be changed to set the spectrum of the additional frequency components. FIGS. 8, 10 and 12 are schematic block diagrams of frequency standards that perform embodiments of the CPT-based frequency standard generating method according to the invention in which the spectrum of the additional frequency components is set to reduce, and preferably minimize, the magnitude of the total a.c. Stark shift by changing parameters additional to or other than the modulation index of the incident light. Elements of the frequency standards shown in FIGS. 8, 10 and 12 that correspond to elements of the frequency standard 100 described above with reference to FIG. 3 are indicated using the same reference numerals, and will not be described in detail here.

The frequency standards shown in FIGS. 8, 10 and 12 include an open-loop spectrum controller similar to the spectrum controller 114 shown in FIG. 3 for simplicity. However, the frequency standards may be easily modified to include a closed-loop spectrum controller, a.c. Stark shift detector and intensity modulator similar to those shown in FIG. 7. Moreover, the frequency standards shown in FIGS. 8, 10 and 12 show the current through a laser being modulated to modulate the light generated by the laser in a manner similar to that illustrated in FIG. 4A. The light generated by the laser can additionally or alternatively be modulated by an external modulator in a manner similar to that shown in FIG. 4B.

FIG. 8 shows the frequency standard 300 that performs a third embodiment of the CPT-based frequency standard generating method according to the invention. In this embodiment, the spectrum of the additional frequency components is set by including in the incident light at least one additional frequency component whose frequency is set independently of the frequencies of the main frequency components. The at least one additional frequency component may be generated by an additional light source, or in some other way, as will be described below.

In the frequency standard 300, the light source 302 additionally includes the laser 340 and an optical arrangement composed of the reflector 345 and the beam combiner 346. The beam combiner spatially overlaps the light 363 generated by the laser 340 with the light 163 generated by the laser 140 to generate the incident light 316 that illuminates the quantum absorber 104. The light 363 contributes at least one additional frequency component to the incident light. In this and in the other embodiments that employ a beam combiner, the spatial overlap provided by the beam combiner need only be a partial overlap, but must occur, at least in part, in the quantum absorber. Other optical arrangements or devices, such as optical fibres, may alternatively be used to overlap the light 163 and the light 363.

In its simplest embodiment, the spectrum controller 114 sets the spectrum of the additional frequency components of the incident light 316 collectively generated by the lasers 140 and 340 by setting one or more of the following parameters:

the intensity of the light 163;

the intensity of the light 363; and the frequency of the light 363.

The spectrum controller 114 may control the frequency of the light 363 by controlling the DC drive signal 322 fed to the laser 340. The spectrum controller may control the intensity of the light generated by the lasers 140 and 340 by controlling the temperature of the respective laser and the respective DC drive signal 122 and 322, by controlling an optical attenuator (not shown) inserted into the respective light path or in other suitable ways.

When the spectrum controller 114 controls the spectrum of the additional frequency components as just described, it does not control the modulation index of the light 163 generated by the laser 140. In this case, the laser 140 may be modulated directly by the modulation clock signal 127 output by the frequency difference tracking signal injector 143. The amplitude of the modulation clock signal 127 sets the modulation index of the light generated by the laser 140 to a level that does not necessarily generate additional frequency components having a spectrum that reduces or minimizes the magnitude of the total a.c. Stark shift. For example, the amplitude of the modulation clock signal may be set to maximize the intensities of the main frequency components, as described above with reference to FIG. 5A. The spectrum controller 114 reduces, and preferably minimizes, the magnitude of the total a.c. Stark shift by setting the spectrum of the additional frequency components in the incident light by controlling only at least one of the above-listed parameters.

The spectrum controller 114 may additionally set the spectrum of the additional frequency components of the incident light 316 by controlling the amplitude of the modulation drive signal 124 in addition to, or instead of, any one or more the above-listed parameters.

The above description refers to the frequency of the light generated by the laser 340. However, it is not critical to the invention that the laser 340 generate light having a single frequency. The laser 340 may be a multi-mode laser that generates light having more than one frequency. In this case, references above to the frequency of the light generated by the laser 340 should be taken to refer to any one or more of the frequencies of the light generated by the laser, or to an average frequency of the light generated by the laser. Suitable weighting may be employed in determining the average frequency. As a further alternative, a radiation source, controlled by the spectrum controller 114, that generates electromagnetic radiation with a narrow-band thermal intensity distribution may be substituted for the laser 340. In this case, references above to the frequency of the light generated by the laser 340 should be taken to refer to the frequency of maximum intensity in the narrow-band thermal intensity distribution of the radiation generated by the radiation source.

The frequency standard 300 may optionally include the modulation oscillator 367 that generates the modulation clock signal 368. The modulation oscillator feeds the modulation clock signal 368 to the spectrum controller 114. The spectrum controller generates from the modulation clock signal the modulation drive signal 324, which it feeds to the laser 340. The modulation drive signal 324 modulates the frequency of the light 363 generated by the laser to increase the number of additional frequency components contributed to the incident light 316 by the laser 340. The amplitude of the modulation drive signal 324 determines the modulation index of the light 363.

When the spectrum controller 114 feeds the modulation drive signal 324 to the laser 340 in addition to the DC drive signal 322, the spectrum controller may set the spectrum of the additional frequency components by controlling one or both of the frequency of the modulation clock signal 368 and the amplitude of the modulation drive signal 324. The spectrum controller may control one or both of the frequency of the modulation clock signal 368 and the amplitude of the modulation drive signal 324 in addition to, or instead of, any one or more of the intensity of the light 163, and the intensity and frequency of the light 363.

It should be noted that, in this embodiment, the spectrum controller 114 can control the spectrum of the additional frequency components contributed to the incident light 316 by the laser 340 completely independently of the frequencies of the main frequency components contributed by the laser 140.

Figure 9:
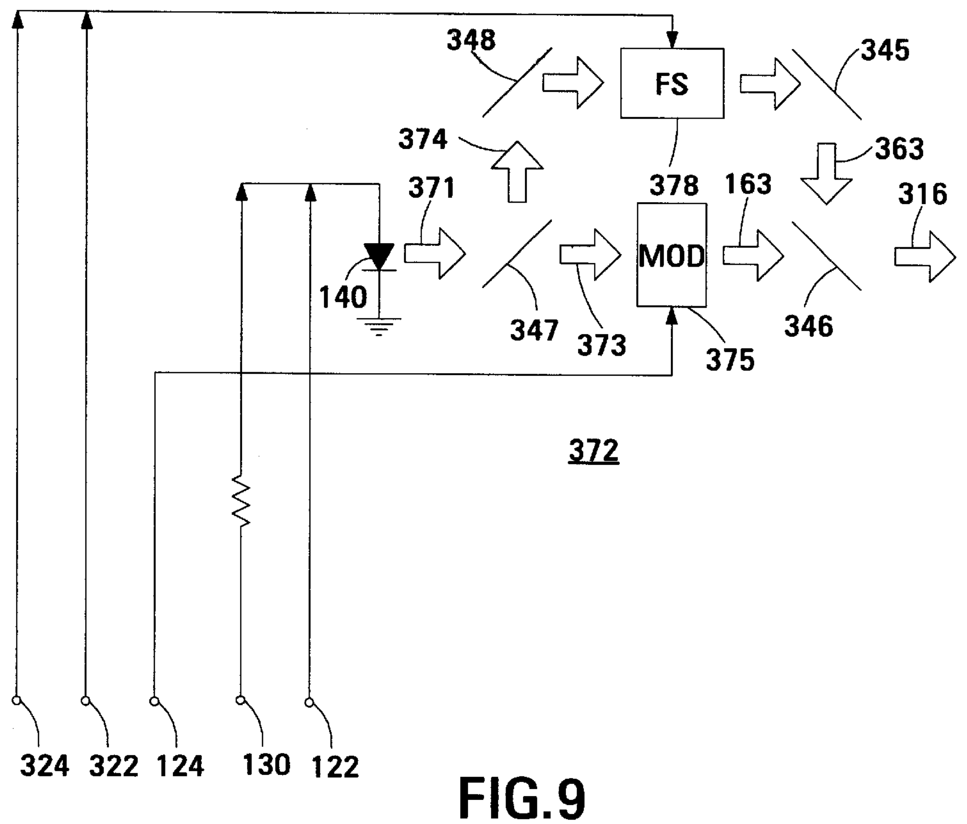
FIG. 9 is a schematic block diagram showing an alternative configuration of the light source of the CPT-based frequency standard shown in FIG. 8.

FIG. 9 is a schematic block diagram of an alternative embodiment 372 of the light source 302 of the frequency standard 300 shown in FIG. 8. In this embodiment, the single laser 140 generates both the light 163 and the light 363 that are spatially overlapped to generate the incident light 316. The incident light includes at least one additional frequency component whose frequency can be independent of the main frequency components having frequencies of $\Omega_1$ and $\Omega_2$. Elements of the light source 372 that correspond to elements of the light source 302 described above with reference to FIG. 8 are indicated using the same reference numerals, and will not be described in detail here.

The light source 372 is composed of the laser 140 and an optical arrangement composed of the beam splitter 347, the reflectors 348 and 345 and the beam combiner 346. The frequency shifter 378 is located anywhere in the optical path between the beam splitter 347, the reflectors 348 and 345 and the beam combiner 346. The modulator 375 is located in the direct path between the beam splitter 347 and the beam combiner 346. The frequency shifter 378 may be an acousto-optical device or another device capable of changing the frequency of light. The modulator 375 may be an acousto-optical device or another device capable of changing one or more of the amplitude, frequency and phase of light.

The laser 140 generates light 371 in response to the DC drive signal 122 and the carrier frequency tracking signal 130. The beam splitter 347 splits the light 371 into the light 373 and the light 374 having an intensity ratio determined by the beam splitter. The light 373 is transmitted by the beam splitter to the modulator 375. The modulator receives the modulation drive signal 124 from the spectrum controller 114, and modulates one or more of the amplitude, frequency and phase of the light 373 at the frequency of the modulation clock signal 126. The modulator directs the resulting modulated light 163, which includes main frequency components with frequencies of $\Omega_1$ and $\Omega_2$, towards the beam combiner 346.

The light 374 is reflected by the reflector 348 to the frequency shifter 378. The frequency shifter changes the frequency of the light 374 to generate the light 363 having a frequency different from that of the light 374. The frequency difference imposed by the frequency shifter is controlled by the DC drive signal 322 generated by the spectrum controller 114. The light 363 from the frequency shifter 378 is reflected by the reflector 345 to the beam combiner 346. The beam combiner spatially overlaps the light 163 and the light 363 to generate the incident light 316, as described above.

The spectrum controller 114 feeds the DC drive signal 322 to the frequency shifter 378. The spectrum controller may additionally feed the modulation drive signal 324 to the frequency shifter to modulate the frequency of the light 374 to generate the light 363 with more than one additional frequency component.

The spectrum controller 114 (FIG. 8) sets the spectrum of the additional frequency components in the incident light 316 by controlling any one or more of the parameters as follows:

the DC drive signal 322, and, hence, the frequency of light 363, relative to that of light 163;

the frequency of modulation clock signal 368, and hence, the modulation frequency of light 363;

the amplitude of modulation drive signal 324, and, hence, the modulation index of light 363; and the amplitude of modulation drive signal 124, and, hence, the modulation index of light 163.

The spectrum controller 114 can control the DC drive signal 322 and the modulation drive signal 324 to set the frequencies and amplitudes of the additional frequency components contributed to the incident light 316 by the light 363 independently of the frequencies of the main frequency components contributed by the light 163.

The modulator 375 may be alternatively located between the laser 140 and the beam splitter 347 to modulate the frequency of the light 371. As a further alternative, the modulator 375 may be omitted and the frequency of the light 371 may be modulated feeding the modulation drive signal 124 to the laser 140, as shown in FIG. 4A. In either case, the light transmitted by the beam splitter 347 provides the light 163. Modulating the frequency of the light 371 imposes corresponding modulation on the light 163, the light 374, the light 363 and the incident light 316. However, the spectrum controller 114 can still control the frequency shifter 378 to set the frequencies of the additional frequency components contributed to the incident light by the light 363 independently of the frequencies of the main frequency components contributed by the light 163.

As a yet further alternative, the spectrum of the additional frequency components in the incident light may be set by including a fixed or variable light attenuator (not shown) in either or both the light paths following the beam splitter 347 to control the intensity that one or both of the light 163 and the light 363 contributes to the incident light 316. When one or both of the light attenuators is a variable attenuator, its attenuation can be controlled by the spectrum controller 114.

As an alternative to using one or more variable light attenuators to set the intensity ratio between the contributions to the incident light 316 from the light 163 and the light 363, either or both of (a) the ratio at which the beam splitter 347 splits the light 371 between light 373 and light 374, and (b) the ratio at which the beam combiner 346 spatially overlaps the light 163 and the light 363 can be statically or dynamically set. Changing the intensity of one or both of the light 163 and the light 363 changes the intensities of the additional frequency components contributed by the light 163 and by the light 363 to the incident light 316, and thus changes the spectrum of the additional frequency components in the incident light. The spectrum of the additional frequency components may be set using the intensities of the light 163 and the light 363 in addition to, or instead of, any one or more of the parameters described above.

FIG. 10 is a schematic block diagram showing a frequency standard 400 that performs a fourth embodiment of the CPT-based frequency standard generating method according to the invention. In this embodiment, the spectrum of the additional frequency components of the incident light is set by modulating the frequency of the incident light at an additional modulation frequency. The additional modulation frequency is additional to the modulation frequency defined by the modulation clock signal 126 generated by the VCO 112. The additional modulation frequency generates the incident light with additional frequency components whose frequencies, and, hence, spectrum, can be set independently of the frequencies of the main frequency components and the additional frequency components generated by modulating the incident light at the modulation frequency defined by the modulation clock signal 126. This provides a greater versatility of control over the spectrum of the additional frequency components.

In addition, modulating the laser 140 with the additional modulation frequency allows the following additional possibilities for generating the main frequency components and for generating the additional frequency components with differing spectra:

the carrier frequency of the light generated by the laser 140 provides one of the main frequency components and the other of the main frequency components is generated by modulating the carrier frequency at one of the modulation frequencies;

the carrier frequency of the light generated by the laser 140 provides one of the main frequency components and the other of the main frequency components is generated by modulating the carrier frequency at both of the modulation frequencies;

one of the main frequency components is generated by modulating the light generated by the laser 140 at one of the modulation frequencies and the other of the main frequency components is generated by modulating at the other of the modulation frequencies;

both of the main frequency components are generated by modulating the laser at one of the modulation frequencies; and both of the main frequency components are generated by modulating the laser at both of the modulation frequencies.

The frequency standard 400 additionally includes the modulation oscillator 467. The modulation oscillator generates the modulation clock signal 468 that directly or indirectly modulates the incident light 416 generated by the light source 402 to increase the number of additional frequency components in the incident light.

The output of the modulation oscillator 467 is fed to the spectrum controller 114. The spectrum controller generates the additional modulation drive signal 424 in response to the modulation clock signal 468 and feeds the modulation drive signal 424 to the light source 402. In the light source 402, the modulation drive signal 424 and the modulation drive signal 124 both modulate the frequency of the light generated by the laser 140 to generate the incident light 416.

Figure 11A:
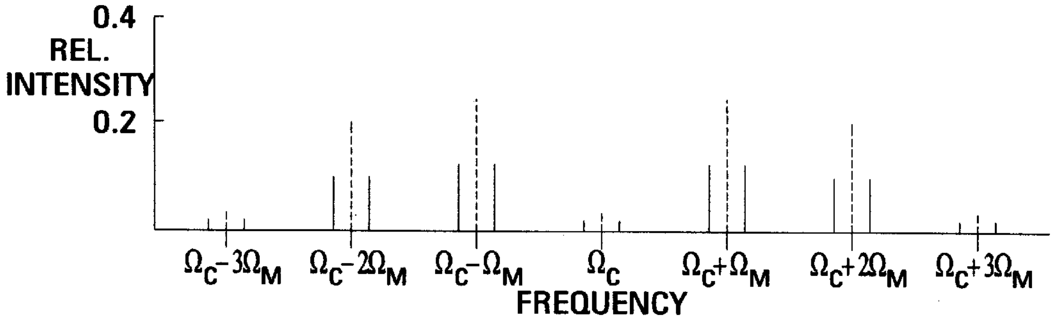
FIGS. 11A and 11B are graphs showing examples of the frequency components generated when the incident light is modulated with a modulation frequency of 3.4 GHz and an additional modulation frequency of 500 MHz and 3.9 GHz, respectively.
Figure 11B:
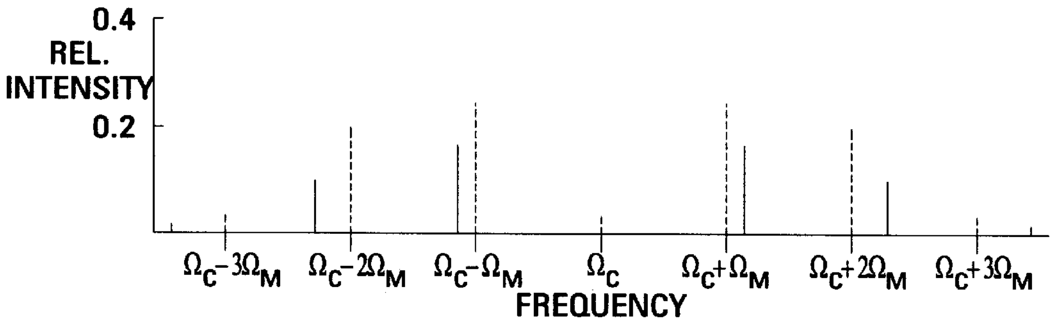

Additional frequency components differing in frequency by about 500 MHz or ±500 MHz from the frequency components generated by the modulation drive signal 124 are particularly effective in reducing the magnitude of the total a.c. Stark shift. Such additional frequency components can be generated by configuring the modulation oscillator 467 to generate the modulation clock signal 468 at a frequency equal to the desired frequency difference, e.g., about 500 MHz. FIG. 11A shows an example of the frequency components generated when the VCO 112 generates the modulation clock signal 126 at 3.9 GHz and the modulation oscillator 467 generates the modulation clock signal 468 at 500 MHz. In FIGS. 11A and 11B, the frequency components generated in response to the modulation clock signal 126 are shown by broken lines and those generated in response to the modulation clock signal 468 are shown by solid lines. The frequency differences between the frequency components generated in response to the modulation clock signal 468 and those generated in response to the modulation clock signal 126 depend on the frequency of the modulation clock signal 468.

Alternatively, the modulation oscillator 467 can be configured to generate the modulation clock signal 468 at a frequency equal to the frequency of the modulation clock signal 126 plus the desired frequency difference, e.g., about (3.4+0.5=3.9) GHz. FIG. 11B shows an example of the frequency components generated when the frequency of the modulation clock signal 468 is 3.9 GHz. The frequency components resulting from intermodulation between the two modulation frequencies have been omitted to simplify the drawing. Changing the frequency of the modulation clock signal 468 directly changes the frequency differences between the additional frequency components generated in response to the modulation clock signal 468.

Modulating the frequency of the incident light 416 generated by the laser 140 with an additional modulation frequency generates more than one more additional frequency component. The additional frequency components include additional frequency components at frequencies close to the peaks of the a.c. Stark shift vs. frequency curve shown in FIG. 2. The additional frequency components generated in response to the modulation clock signal 468 are not harmonically related to the main frequency components having frequencies of $\Omega_1$ and $\Omega_2$ This allows the frequencies of such additional frequency components to be set independently of the frequencies of the main frequency components, and provides the spectrum controller 114 with more flexibility to set the spectrum of the additional frequency components. For example, this allows the spectrum controller to set the spectrum of the additional frequency components by controlling the frequencies of the additional frequency components in addition to, or instead of, their intensities.

The spectrum controller 114 sets the spectrum of the additional frequency components in the incident light 416 by controlling any one or more of the following parameters:

the frequency of the modulation clock signal 468, and, hence, the additional modulation frequency;

the amplitude of the modulation drive signal 424 and, hence, the modulation index of the incident light 416 at the additional modulation frequency; and the amplitude of the modulation drive signal 124.

The modulation oscillator 467 may include control circuitry (not shown) that locks the phase or frequency of the modulation clock signal 468 relative to that of the modulation clock signal 126 generated by the VCO 112. In this case, the spectrum controller sets the frequency difference between the modulation clock signals when it sets the frequency modulation clock signal 468.

Multiple modulation frequencies as just described may be applied to one or both of the lasers 140 and 340 in the frequency standard shown in FIG. 8.

FIG. 12 is a schematic block diagram of a frequency standard 500 that performs a fifth embodiment of the CPT-based frequency standard generating method according to the invention. In this embodiment, the main frequency components $\Omega_1$ and $\Omega_2$ are generated by different light sources. The light generated by at least one of the light sources is modulated to generate at least the additional frequency components. Elements of the frequency standard 500 that correspond to elements of the frequency standard 300 described above with reference to FIG. 8 are indicated using the same reference numerals, and will not be described in detail here.

The frequency standard 500 additionally includes the fast photo detector 581 and the phase/frequency detector 582. The fast photo detector receives a sample 583 of the incident light 516 from the beam combiner 346. The phase/frequency detector has two inputs. One is connected to the output of the fast photo detector and the other is connected to the output of the frequency difference tracking signal injector 543 to receive the modulation clock signal 527. The output of the phase/frequency detector provides the drive signal 322 for the laser 340 in the light source 502.

The optical arrangement of the light source 502 is the same as that of the light source 302 described above with reference to FIG. 8, except that the light source 502 provides the sample 583 of the incident light 516 to the fast photo detector 581, as described above.

The laser 140 generates the light 163 that includes a main frequency component having a frequency of $\Omega_1$ and the laser 340 generates the light 363 that includes a main frequency component having a frequency of $\Omega_2$. The frequencies of the main frequency components in the light generated by the lasers 140 and 340 may be reversed. When the respective laser is unmodulated, the light generated by the laser exclusively provides the main frequency component having the frequency of $\Omega_1$ or $\Omega_2$. When the respective laser is modulated, the carrier frequency of the laser or one of the frequency components generated by the modulating the light generated by the laser may provide the main frequency component.

The frequency of the main frequency component generated by the laser 140 is controlled by the carrier frequency controller 108 in response to the carrier frequency tracking signal 130 to set the frequency of the main frequency component equal to one of the transition frequencies $\omega_1$ and $\omega_2$. The frequency difference controller 110 operates in response to the frequency difference tracking signal 132 to control the frequency of the frequency difference clock signal 526 generated by the VCO 512. The frequency difference clock signal 526 is also fed to the output 133 to provide the frequency reference signal, and is additionally fed to the input of the frequency difference tracking signal injector 543. The frequency difference clock signal 526 determines the frequency of the frequency difference clock signal 527 fed to the phase/frequency detector 582 from the frequency difference tracking signal injector.

The output of the phase/frequency detector 582 sets the drive signal 322 fed to the laser 340 to a level that causes the laser 340 to generate the main frequency component of the light 363 at a frequency that differs by $\omega_0$ from that of the main frequency component of the light 163 generated by the laser 140.

The light generated by one or both of the lasers 140 and 340 is frequency modulated to generate at least the additional frequency components. Modulating the frequency of the light generated by one or both of the lasers may also be used to generate one or both of the main frequency components, as noted above.

The modulation oscillators 567 and 367 respectively generate the modulation clock signals 568 and 368 that are fed to the spectrum controller 114. The frequencies of the modulation clock signals 568 and 368 are controlled by the spectrum controller. The spectrum controller receives the modulation clock signals 568 and 368 and, in response to them, respectively generates the modulation drive signals 124 and 324. The spectrum controller feeds the modulation drive signals 124 and 324 to the lasers 140 and 340, respectively. The spectrum controller sets the amplitudes of the modulation drive signals to determine the modulation index of the light generated by the respective laser.

The spectrum controller 114 sets the spectrum of the additional frequency components of the incident light 516 by controlling any one or more of the following parameters:

the frequency of the modulation clock signal 568, and, hence, the modulation frequency of the light 163;

the amplitude of the modulation drive signal 124, and, hence, the modulation index of the light 163;

the frequency of the modulation clock signal 368, and, hence, the modulation frequency of the light 363; and the amplitude of the modulation drive signal 324, and, hence, the modulation index of the light 363.

When one or more frequency components resulting from modulating one or both of the light 163 and 363 provide one or both of the main frequency components, the spectrum controller 114 is preferably constrained from controlling the frequency of the modulation clock signal corresponding to the main frequency component.

The spectrum controller 114 may additionally or alternatively set the spectrum of the additional frequency components of the incident light 516 by controlling one or both of the intensity of the light 363 and the intensity of the light 163, as described above.

The laser 340 is described above as generating light having a frequency. However, this is not critical to the invention. The laser 340 may be a multi-mode laser that generates light having more than one frequency component, as described above.

Figure 13:
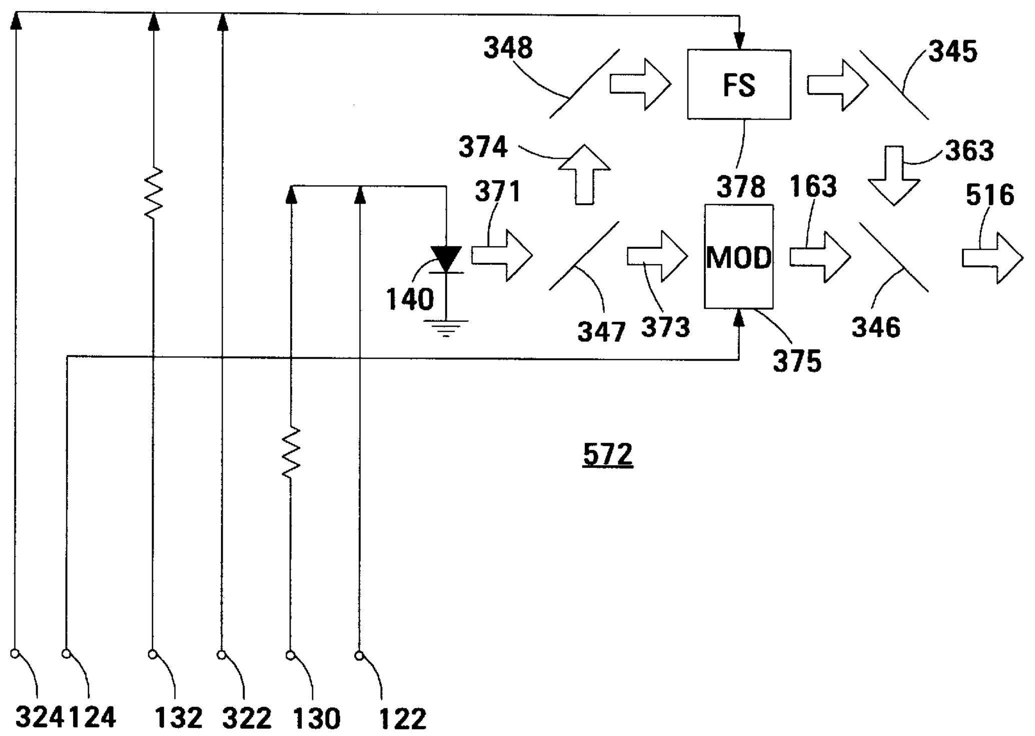
FIG. 13 is a schematic block diagram showing an alternative configuration of the light source of the CPT-based frequency standard shown in FIG. 12.

FIG. 13 is a schematic block diagram of an alternative embodiment 572 of the light source 502 of the frequency standard 500 shown in FIG. 12. This embodiment of the light source uses a single laser in a manner similar to that described above with reference to FIG. 9 to generate the light 163 and the light 363 that are spatially overlapped to provide the incident light 516. Elements of the light source 572 that correspond to elements of the light source 372 described above with reference to FIG. 9 are indicated using the same reference numerals, and will not be described in detail here.

The light source 572 differs from the above-described light source 372 only in that, in the light source 572, the frequency shifter 378 additionally receives the frequency difference tracking signal 132 from the oscillator 142.

The spectrum controller 114 may set the spectrum of the additional frequency components by controlling the intensities at which the light 163 and the light 363 contribute to the incident light 516, as described above, in addition to or instead of any one or more of the parameters described above.

The various embodiments of the frequency standard generating method according to the invention are described above in terms of a quantum absorber that has transitions with energies that correspond to the electro-magnetic radiation commonly known as near infra-red light. It will be apparent to a person of ordinary skill in the art that the embodiments described above can easily be modified to operate with a quantum absorber that has transitions with energies that correspond to electro-magnetic radiation in other parts of the spectrum including, but not limited to ultra-violet light, visible light, far infra-red radiation and microwave radiation. Suitable generators and detectors for electro-magnetic radiation in these parts of the spectrum are known in the art.

Figure 14:
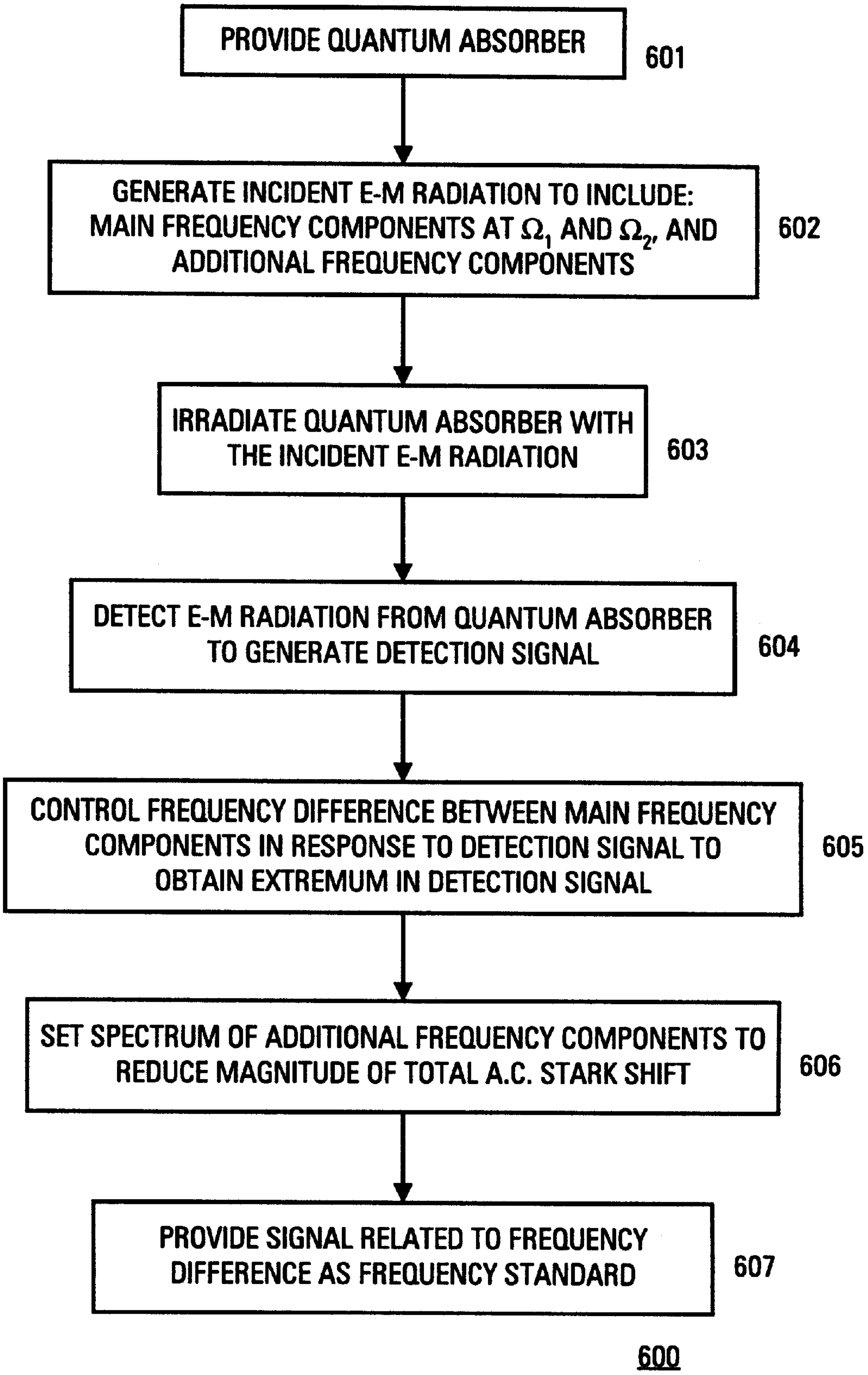
FIG. 14 is a flow chart showing the CPT-based frequency standard generating method according to the invention.

FIG. 14 is a flow chart showing an embodiment 600 of a method according to the invention for generating a frequency standard using a quantum absorber that absorbs electro-magnetic radiation.

In the method 600, in process 601, a quantum absorber is provided. The quantum absorber has transitions including a first transition between a first lower quantum state and an upper quantum state, and a second transition between a second lower quantum state and the upper quantum state. The first transition and the second transition have energies that correspond to frequencies of $\omega_1$ and $\omega_2$, respectively.

In process 602, incident electro-magnetic radiation is generated. The incident electro-magnetic radiation includes main frequency components and additional frequency components. The main frequency components have frequencies of $\Omega_1$ and $\Omega_2$, which are equal to $\omega_1$ and $\omega_2$, respectively, and differ in frequency by the frequency difference $\Omega_0$. The additional frequency components collectively have a spectrum that describes their intensities and frequencies.

In process 603, the quantum absorber is irradiated with the incident electro-magnetic radiation.

In process 604, the electro-magnetic radiation from the quantum absorber is detected to generate a detection signal.

In process 605, the frequency difference between the main frequency components is controlled in response to the detection signal to obtain an extremum in the detection signal. The extremum indicates that the frequency difference corresponds in energy to the energy difference between the lower quantum states. The energy difference is subject to a total a.c. Stark shift that impairs the accuracy and stability of the frequency standard.

In process 606, the spectrum of the additional frequency components is set to reduce the magnitude of the total a.c. Stark shift.

Finally, in process 607, a signal related in frequency to the frequency difference is provided as the frequency standard.

In a preferred embodiment of the above method, in process 601, rubidium-87 atoms in the vapor state are provided as the quantum absorber. In process 602, the incident electro-magnetic radiation generated is near infrared light having a frequency corresponding to the transition between the $5S_{1/2}$ and $5P_{1/2}$ states, i.e., the $D_1$ line.

In process 604, the electro-magnetic radiation detected by the detector may be any one or more of the unabsorbed portion of the incident light transmitted through the quantum absorber, the fluorescent light generated by the quantum absorber in response to the incident light and the coherent emission generated by the quantum absorber in response to the incident light.

In process 606, the spectrum of the additional frequency components can be set by controlling any one or more of the following parameters: the number of additional frequency components, the intensity of at least one of the additional frequency components and the frequency of at least one of the additional frequency components.

When the method according to the invention is performed using the embodiment shown in FIG. 3, in process 602, the incident electro-magnetic radiation is generated by providing electro-magnetic radiation, and modulating the electro-magnetic radiation at a modulation frequency and with a modulation index to generate the additional frequency components and at least one of the main frequency components of the incident electro-magnetic radiation. In process 605, the frequency difference is controlled by controlling the modulation frequency in response to the detection signal. In process 606, the spectrum of the additional frequency components is set by setting the modulation index to a value that minimizes the magnitude of the total a.c. Stark shift.

A preferred embodiment of the method is a closed-loop embodiment, such as that performed by the embodiment shown in FIG. 7, in which the spectrum of the additional frequency components is set by measuring the total a.c. Stark shift and adjusting the spectrum in response to the measured total a.c. Stark shift to the value that minimizes the magnitude of the total a.c. Stark shift. The total a.c. Stark shift may be measured by intensity modulating the incident electro-magnetic radiation with an intensity modulation signal and, in response to the intensity modulation signal, detecting a frequency shift component in the detection signal to generate the measured total a.c. Stark shift. Other techniques for measuring the total a.c. Stark shift may alternatively be used.

When the method according to the invention is performed using the embodiment shown in FIG. 10, in process 602, the incident electro-magnetic radiation is modulated by a modulation frequency additional to the original modulation frequency that generates the at least one of the main frequency components. The additional modulation frequency generates more additional frequency components. In process 606, the spectrum of the additional frequency components is set by setting at least one of the frequency and amplitude of the additional modulation frequency. This may be done in addition to or instead of setting the modulation index of the incident light at the original modulation frequency.

When the method according to the invention is performed using the embodiment shown in FIG. 8, in process 602, the electro-magnetic radiation provided is first electro-magnetic radiation and has a first intensity and a first frequency, and second electro-magnetic radiation is additionally provided. The second electro-magnetic radiation has a second intensity and a second frequency. The first electro-magnetic radiation and the second electro-magnetic radiation are spatially overlapped, at least partially, to generate the incident electro-magnetic radiation. The second electro-magnetic radiation provides at least one of the additional frequency components of the incident electro-magnetic radiation. In process 606, the spectrum of the additional frequency components is set by setting at least one of the first intensity, the second intensity and the second frequency to a respective value that minimizes the magnitude of the total a.c. Stark shift.

When the method according to the invention is performed using the embodiment shown in FIG. 9, in process 602, the second electro-magnetic radiation is provided by splitting electro-magnetic radiation into two components, one of which provides the first electro-magnetic radiation, the other of which is subject to frequency shifting and provides the second electro-magnetic radiation.

When the method according to the invention is performed using the embodiment shown in FIG. 12, in process 602, the main frequency components with frequencies of $\Omega_1$ and $\Omega_2$ are provided by different sources and the electro-magnetic radiation from the two sources is spatially overlapped to generate the incident electro-magnetic radiation. The electro-magnetic radiation generated by at least one of the sources is modulated to provide the additional frequency components. In process 605, the frequency of electro-magnetic radiation generated by at least one of the sources is controlled in response to the detection signal to control the frequency difference.

Although this disclosure describes illustrative embodiments of the invention in detail, it is to be understood that the invention is not limited to the precise embodiments described, and that various modifications may be practiced within the scope of the invention defined by the appended claims.

We claim:

1. A method for generating a frequency standard, the method comprising:

providing a quantum absorber having transitions including a first transition between a first lower quantum state and an upper quantum state, and a second transition between a second lower quantum state and the upper quantum state, the first transition and the second transition having energies that correspond to frequencies of $\omega_1$ and $\omega_2$, respectively, the lower quantum states differing in energy by an energy difference subject to a total a.c. Stark shift having a magnitude;

generating incident electro-magnetic radiation, the incident electro-magnetic radiation including:

main frequency components at frequencies of $\Omega_1$ and $\Omega_2$, equal to $\omega_1$ and $\omega_2$, respectively, and differing in frequency by a frequency difference, and additional frequency components collectively having a spectrum; irradiating the quantum absorber with the incident electro-magnetic radiation;

detecting electro-magnetic radiation from the quantum absorber to generate a detection signal;

controlling the frequency difference to obtain an extremum in the detection signal, the extremum indicating that the frequency difference corresponds to the energy difference between the lower quantum states;

setting the spectrum of the additional frequency components to reduce the magnitude of the total a.c. Stark shift; and providing a frequency standard signal related in frequency to the frequency difference.

2. The method of claim 1, in which:

generating the incident electro-magnetic radiation includes:

providing electro-magnetic radiation, and modulating the electro-magnetic radiation with a modulation frequency to generate the additional frequency components and at least one of the main frequency components of the incident electro-magnetic radiation; and in controlling the frequency difference, the modulation frequency is controlled in response to the detection signal.

3. The method of claim 2, in which:

in modulating the electro-magnetic radiation, the electro-magnetic radiation is modulated with the modulation frequency at a modulation index; and setting the spectrum of the additional frequency components includes setting the modulation index to reduce the magnitude of the total a.c. Stark shift.

4. The method of claim 3, in which setting the modulation index includes:

measuring the total a.c. Stark shift to generate a measured total a.c. Stark shift; and adjusting the modulation index in response to the measured total a.c. Stark shift to minimize the magnitude of the total a.c. Stark shift.

5. The method of claim 4, in which measuring the total a.c. Stark shift includes:

intensity modulating the incident electro-magnetic radiation with an intensity modulation signal; and in response to the intensity modulation signal, detecting a frequency shift component in the detection signal to generate the measured total a.c. Stark shift.

6. The method of claim 2, in which:

in providing electro-magnetic radiation, first electro-magnetic radiation having a first frequency and a first intensity is provided;

in modulating the electro-magnetic radiation, the first electro-magnetic radiation is modulated;

generating the incident electro-magnetic radiation additionally includes:

providing second electro-magnetic radiation having a second frequency and a second intensity, and spatially overlapping, at least partially, the first electro-magnetic radiation and the second electro-magnetic radiation to generate the incident electro-magnetic radiation, the second electro-magnetic radiation constituting one of the additional frequency components of the incident radiation; and setting the spectrum of the additional frequency components includes setting at least one of the first intensity, the second intensity and the second frequency to a respective value that reduce the magnitude of the total a.c. Stark shift.

7. The method of claim 6, in which, in providing the second electro-magnetic radiation, second electro-magnetic radiation including more than one frequency component is provided.

8. The method of claim 6, in which:

in modulating the electro-magnetic radiation, the first electro-magnetic radiation is modulated with a first modulation index; and setting the spectrum of the additional frequency components additionally includes setting the first modulation index to reduce the total a.c. Stark shift one of (a) in addition to, and (b) in lieu of, setting at least one of the first intensity, the second intensity and the second frequency.

9. The method of claim 6, in which:

in modulating the first electro-magnetic radiation, the first electro-magnetic radiation is modulated with a first modulation frequency at a first modulation index;

the method additionally comprises modulating the second electro-magnetic radiation with a second modulation frequency at a second modulation index; and setting the spectrum of the additional frequency components additionally includes setting at least one of the first modulation index, the second modulation frequency and the second modulation index to reduce the magnitude of the total a.c. Stark shift one of (a) in addition to, and (b) in lieu of, at least one of the first intensity, the second intensity and the second frequency.

10. The method of claim 6, in which:

providing the first electro-magnetic radiation and providing the second electro-magnetic radiation collectively include:

splitting the electro-magnetic radiation into the first electro-magnetic radiation and the second electro-magnetic radiation, both having the first frequency; and shifting the frequency of the second electro-magnetic radiation from the first frequency to the second frequency.

11. The method of claim 10, in which modulating the electro-magnetic radiation includes at least one of:

(a) modulating the electro-magnetic radiation, and (b) modulating at least one of (1) the first electro-magnetic radiation and (2) the second electro-magnetic radiation.

12. The method of claim 2, in which:

in modulating the electro-magnetic radiation, the electro-magnetic radiation is modulated with modulation frequencies each having a respective frequency and modulation index to generate the additional frequency components and at least one of the main frequency components of the incident electro-magnetic radiation; and setting the spectrum of the additional frequency components includes setting at least one of the frequency and the modulation index of at least one of the modulation frequencies to reduce the magnitude of the total a.c. Stark shift.

13. The method of claim 12, in which generating the incident electro-magnetic radiation includes:

providing first electro-magnetic radiation modulated at at least one of the modulation frequencies with the respective modulation index;

providing second electro-magnetic radiation modulated at at least one other of the modulation frequencies with the respective modulation index; and spatially overlapping, at least partially, the first electro-magnetic radiation and the second electro-magnetic radiation to generate the incident electro-magnetic radiation.

14. The method of claim 13, in which:

the first electro-magnetic radiation has a first intensity;

the second electro-magnetic radiation has a second intensity; and setting the spectrum of the additional frequency components includes setting at least one of the first intensity and the second intensity to reduce the magnitude of the total a.c. Stark shift (a) in addition to, and (b) in lieu of, at least one of the frequency and the modulation index of at least one of the modulation frequencies.

15. The method of claim 12, in which setting the intensity and frequency of the additional frequency components includes:

measuring the total a.c. Stark shift to generate a measured total a.c. Stark shift; and adjusting the at least one of the frequency and the modulation index of at least one of the modulation frequencies in response to the measured total a.c. Stark shift to minimize the magnitude of the total a.c. Stark shift.

16. The method of claim 15, in which measuring the total a.c. Stark shift includes:

intensity modulating the incident electro-magnetic radiation with an intensity modulation signal; and in response to the intensity modulation signal, synchronously detecting a frequency shift component in the detection signal as the measured total a.c. Stark shift.

17. The method of claim 1, in which:

generating the incident electro-magnetic radiation includes:

providing first electro-magnetic radiation having a first frequency and second electro-magnetic radiation having a second frequency, modulating the first electro-magnetic radiation at a modulation frequency to generate at least the additional frequency components, and spatially overlapping, at least partially, the first electro-magnetic radiation and the second electro-magnetic radiation to generate the incident electro-magnetic radiation; and in controlling the frequency difference, at least one of the first frequency and the second frequency is controlled in response to the detection signal.

18. The method of claim 17, in which the first frequency is one of $\Omega_1$ and $\Omega_2$, and the second frequency is the other of $\Omega_1$ and $\Omega_2$.

19. The method of claim 17, in which in modulating the first electro-magnetic radiation, the first electro-magnetic radiation is modulated additionally to generate at least one of the main frequency components.

20. The method of claim 17, in which:

in modulating the first electro-magnetic radiation, the first electro-magnetic radiation is modulated at the modulation frequency with a modulation index; and setting the spectrum of the additional frequency components includes setting the modulation index to reduce the magnitude of the total a.c. Stark shift.

21. The method of claim 17, in which:

in modulating the first electro-magnetic radiation, the first electro-magnetic radiation is modulated with modulation frequencies each having a respective frequency and modulation index to generate at least the additional frequency components of the incident electro-magnetic radiation; and setting the spectrum of the additional frequency components includes setting at least one of the frequency and the modulation index of at least one of the modulation frequencies to reduce the magnitude of the total a.c. Stark shift.

22. The method of claim 17, in which providing the first electro-magnetic radiation and the second electro-magnetic radiation includes:

providing electro-magnetic radiation having the first frequency;

splitting the electro-magnetic radiation into the first electro-magnetic radiation and the second electro-magnetic radiation, both having the first frequency; and changing the frequency of the second electro-magnetic radiation from the first frequency to the second frequency.

23. The method of claim 17, in which:

the first electro-magnetic radiation has a first intensity;

the second electro-magnetic radiation has a second intensity; and setting the spectrum of the at least one of the additional frequency components includes setting at least one of the first intensity and the second intensity to reduce the magnitude of the total a.c. Stark shift.

24. The method of claim 17, in which:

in modulating the first electro-magnetic radiation, the first electro-magnetic radiation is modulated at a first modulation frequency; and generating the incident electro-magnetic radiation additionally includes modulating the second electro-magnetic radiation with a second modulation frequency at a second modulation index to generate additional ones of the additional frequency components.

25. The method of claim 24, in which in modulating the second electro-magnetic radiation with a second modulation frequency at a second modulation index, the second electro-magnetic radiation is modulated additionally to generate at least one of the main frequency components.

26. The method of claim 17, in which:

in providing the first electro-magnetic radiation, the first electro-magnetic radiation having a first intensity is provided;

in providing the second electro-magnetic radiation, the second electro-magnetic radiation having a second intensity is provided; and the generating the incident electro-magnetic radiation additionally includes providing third electro-magnetic radiation having a third frequency and a third intensity;

spatially overlapping, at least partially, the first electro-magnetic radiation and the second electro-magnetic radiation additionally includes spatially overlapping, at least partially, the third electro-magnetic radiation with the first and second electro-magnetic radiation to generate the incident electro-magnetic radiation, the third electro-magnetic radiation constituting one of the additional frequency components of the incident radiation.

27. The method of claim 26, in which, setting the spectrum of the additional frequency components includes setting at least one of the first intensity, the second intensity, the third intensity, and the third frequency to reduce the magnitude of the total a.c. Stark shift.

28. The method of claim 1, in which setting the spectrum of the additional frequency components includes:

measuring the total a.c. Stark shift to generate a measured total a.c. Stark shift; and adjusting the spectrum of the additional frequency components in response to the measured total a.c. Stark shift to minimize the magnitude of the total a.c. Stark shift.

29. The method of claim 28, in which measuring the total a.c. Stark shift includes:

intensity modulating the incident electro-magnetic radiation with an intensity modulation signal; and in response to the intensity modulation signal, detecting a frequency shift component in the detection signal to generate the measured total a.c. Stark shift.

* * * * *